US010585300B2

(12) United States Patent
Akutagawa et al.

(10) Patent No.: US 10,585,300 B2
(45) Date of Patent: Mar. 10, 2020

(54) INFRARED CONTROL FILM AND WINDOW

(71) Applicant: FUJIFILM Corporation, Tokyo (JP)

(72) Inventors: Nobuyuki Akutagawa, Minami-ashigara (JP); Jun Takeda, Minami-ashigara (JP)

(73) Assignee: FUJIFILM Corporation, Tokyo (JP)

(\*) Notice: Subject to any disclaimer, the term of this patent is extended or adjusted under 35 U.S.C. 154(b) by 97 days.

(21) Appl. No.: 15/986,967

(22) Filed: May 23, 2018

(65) Prior Publication Data

US 2018/0267341 A1  Sep. 20, 2018

Related U.S. Application Data

(63) Continuation of application No. PCT/JP2016/084605, filed on Nov. 22, 2016.

(30) Foreign Application Priority Data

Nov. 24, 2015 (JP) .................. 2015-229031

(51) Int. Cl.
*G02F 1/13* (2006.01)
*B32B 7/02* (2019.01)
(Continued)

(52) U.S. Cl.
CPC ............... *G02F 1/132* (2013.01); *B32B 7/02* (2013.01); *B32B 17/10504* (2013.01);
(Continued)

(58) Field of Classification Search
CPC .. G02F 1/132; G02F 2203/01; G02F 2203/11; B32B 7/02; B32B 27/28;
(Continued)

(56) References Cited

U.S. PATENT DOCUMENTS

| 5,766,518 A | 6/1998 | Ishii |
| 2010/0025641 A1 | 2/2010 | Jimbo et al. |
| 2012/0307348 A1* | 12/2012 | Nomura ................. G02F 1/172 359/296 |

FOREIGN PATENT DOCUMENTS

| JP | 9-29882 A | 2/1997 |
| JP | 10-204425 A | 8/1998 |

(Continued)

OTHER PUBLICATIONS

Japanese Office Action, dated May 28, 2019, for Japanese Application No. 2017-552666, with an English translation.

(Continued)

*Primary Examiner* — Charles S Chang
(74) *Attorney, Agent, or Firm* — Birch, Stewart, Kolasch & Birch, LLP

(57) ABSTRACT

Provided are: an infrared control film in which an infrared light transmittance changes depending on the temperature, a tint in a front direction is excellent, and durability is excellent; and a window including the infrared control film. The infrared control film includes: a liquid crystal layer; and two substrates each of which includes at least one of an ultraviolet absorber or a colorant, in which the liquid crystal layer is disposed between the two substrates, the substrate includes 0.001 mass % or higher of the ultraviolet absorber or the colorant, a transmittance of the infrared control film at 0° C. with respect to an incidence ray at 1000 nm at a polar angle of 0° is higher than 70%, a transmittance of the infrared control film at 40° C. with respect to an incidence ray at 1000 nm at a polar angle of 0° is lower than 60%, and the following expressions are satisfied: 0.8<a1<1.2, 0.8<b1<1.2, a1=(Transmittance of Incidence Ray at 450 nm at Polar Angle of 0°)/(Transmittance of Incidence Ray at 550 nm at Polar Angle of 0°), b1=(Transmittance of Incidence (Continued)

Ray at 550 nm at Polar Angle of 0°)/(Transmittance of Incidence Ray at 700 nm at Polar Angle of 0°).

15 Claims, 2 Drawing Sheets

(51) Int. Cl.

| | |
|---|---|
| *B32B 27/18* | (2006.01) |
| *G02B 5/22* | (2006.01) |
| *C09K 19/34* | (2006.01) |
| *C09K 19/20* | (2006.01) |
| *G02B 5/26* | (2006.01) |
| *C09K 19/32* | (2006.01) |
| *G02B 5/20* | (2006.01) |
| *C03C 27/06* | (2006.01) |
| *B32B 17/10* | (2006.01) |
| *B32B 27/30* | (2006.01) |
| *B32B 27/36* | (2006.01) |
| *B65H 18/28* | (2006.01) |
| *C09K 19/50* | (2006.01) |
| *C09K 19/56* | (2006.01) |
| *C09K 19/58* | (2006.01) |
| *C09K 19/04* | (2006.01) |

(52) U.S. Cl.
CPC ............ *B32B 27/18* (2013.01); *B32B 27/306* (2013.01); *B32B 27/36* (2013.01); *B65H 18/28* (2013.01); *C03C 27/06* (2013.01); *C09K 19/2007* (2013.01); *C09K 19/2014* (2013.01); *C09K 19/322* (2013.01); *C09K 19/3444* (2013.01); *C09K 19/3486* (2013.01); *C09K 19/3491* (2013.01); *C09K 19/3497* (2013.01); *C09K 19/50* (2013.01); *C09K 19/56* (2013.01); *C09K 19/588* (2013.01); *G02B 5/208* (2013.01); *G02B 5/223* (2013.01); *G02B 5/26* (2013.01); *B32B 2250/05* (2013.01); *B65H 2515/60* (2013.01); *B65H 2519/00* (2013.01); *B65H 2701/172* (2013.01); *B65H 2701/1712* (2013.01); *C09K 2019/0448* (2013.01); *C09K 2219/13* (2013.01); *G02F 2203/01* (2013.01); *G02F 2203/11* (2013.01)

(58) Field of Classification Search
CPC ..... B32B 27/18; B32B 27/36; B32B 2250/05; G02B 5/223; G02B 5/26; G02B 5/208; C09K 19/50; C09K 19/56; C09K 19/588; C09K 2219/13; C09K 2019/0448; C09K 19/3491; C09K 19/2014; C09K 19/3486; C09K 19/3497; C09K 19/322; C09K 19/3444; C09K 19/2007; C03C 27/06; B65H 18/28; B65H 2701/1712; B65H 2515/60; B65H 2519/00; B65H 2701/172
USPC .......................................................... 349/12
See application file for complete search history.

(56) References Cited

FOREIGN PATENT DOCUMENTS

| | | |
|---|---|---|
| JP | 2010-61119 A | 3/2010 |
| JP | 2011-141325 A | 7/2011 |

OTHER PUBLICATIONS

International Preliminary Report on Patentability and Written Opinion of the International Searching Authority(Forms PCT/IB/326, PCT/IB/373 and PCT/ISA/237), dated Jun. 7, 2018, for corresponding International Application No. PCT/JP2016/084605, with an English Translation of the Written Opinion.
International Search Report (Form PCT/ISA/210), dated Feb. 14, 2017, for corresponding International Application No. PCT/JP2016/084605, with an English Translation.

\* cited by examiner

INFRARED CONTROL FILM AND WINDOW

CROSS-REFERENCE TO RELATED APPLICATIONS

This application is a Continuation of PCT International Application No. PCT/JP2016/084605, filed on Nov. 22, 2016, which claims priority under 35 U.S.C. Section 119(a) to Japanese Patent Application No. 2015-229031 filed on Nov. 24, 2015. Each of the above applications is hereby expressly incorporated by reference, in its entirety, into the present application.

BACKGROUND OF THE INVENTION

1. Field of the Invention

The present invention relates to an infrared control film and a window.

2. Description of the Related Art

Recently, windows having various functions tend to be used to reduce energy consumed for air conditioning in a building or the like.

For example, JP1997-029882A (JP-H9-029882A) discloses a light control material including a laminate as a major component, the laminate having a structure in which a liquid crystal material is disposed on at least one light-transmitting substrate and having the following properties: a light transmittance in a wavelength range of 400 to 750 nm in a temperature range of 273 K to 313 K is 50% or higher; a light transmittance in a wavelength range of 750 to 2000 nm in a temperature range of 273 K or higher and lower than 288 K is 60% or higher; a light transmittance in a wavelength range of 750 to 2000 nm in a temperature range of 298 K to 313 K is 40% or lower; and a light reflectivity in a wavelength range of 750 to 2000 nm is 50% or higher.

JP1997-029882A (JP-H9-029882A) describes that the material can freely control a light transmittance and a light reflectivity at a specific wavelength of sunlight using the specific properties of the liquid crystal compound that vary depending on the temperature change and that an increase in heating load in the winter can be further suppressed using the material compared to a window formed of heat reflecting glass or heat absorbing glass. In the heat reflecting glass or the heat absorbing glass, a metal oxide is formed on a glass surface so as to reflect or absorb infrared light in sunlight. As a result, a temperature increase in a building can be suppressed, and the cooling load can be reduced. In a case where the heat reflecting glass or the heat absorbing glass is used, heat rays do not enter the indoor environment in the winter, and thus the heating load increases. However, with the configuration of the light control material described in JP1997-029882A (JP-H9-029882A), heat rays enter the indoor environment in the winter.

SUMMARY OF THE INVENTION

The present inventors investigated the light control material described in JP1997-029882A (JP-H9-029882A) and found that the tint of the light control material in a front direction is poor.

As described above, an infrared control film in which an infrared light transmittance changes depending on the temperature, a tint in a front direction is excellent, and durability is high is not known.

An object to be achieved by the present invention is to provide an infrared control film in which an infrared light transmittance changes depending on the temperature, a tint in a front direction is excellent, and durability is high.

Another object to be achieved by the present invention is to provide a window including an infrared control film in which an infrared light transmittance changes depending on the temperature, a tint in a front direction is excellent, and durability is high.

As a result of thorough investigation in order to achieve the objects, the present inventors found that the objects can be achieved with an infrared control film in which a liquid crystal layer is disposed between substrates each of which includes a specific content of an ultraviolet absorber or a colorant and in which a wavelength dispersion of a transmittance at a polar angle of 0° is controlled to be substantially flat.

Preferable aspects of the present invention for achieving the above-described object are as follows.

[1] An infrared control film comprising:
at least one liquid crystal layer; and
two substrates each of which includes at least one of an ultraviolet absorber or a colorant,
in which the liquid crystal layer is disposed between the two substrates,
the substrate includes 0.001 mass % or higher of the ultraviolet absorber or the colorant with respect to a total mass of the substrate,
a transmittance of the infrared control film at 0° C. with respect to an incidence ray at 1000 nm at a polar angle of 0° is higher than 70%,
a transmittance of the infrared control film at 40° C. with respect to an incidence ray at 1000 nm at a polar angle of 0° is lower than 60%, and
the following Expression (1-a) and the following Expression (1-b) are satisfied.

$$0.8 < a1 < 1.2 \qquad \text{Expression (1-a)}$$

$$0.8 < b1 < 1.2 \qquad \text{Expression (1-b)}$$

a1=(Transmittance of Incidence Ray at 450 nm at Polar Angle of 0°)/(Transmittance of Incidence Ray at 550 nm at Polar Angle of 0°)
b1=(Transmittance of Incidence Ray at 550 nm at Polar Angle of 0°)/(Transmittance of Incidence Ray at 700 nm at Polar Angle of 0°)

[2] In the infrared control film according to [1], it is preferable that the following Expression (2-a) and the following Expression (2-b) are satisfied.

$$0.8 < a2 < 1.2 \qquad \text{Expression (2-a)}$$

$$0.8 < b2 < 1.2 \qquad \text{Expression (2-b)}$$

a2=(Transmittance of Incidence Ray at 450 nm at Polar Angle of 60°)/(Transmittance of Incidence Ray at 550 nm at Polar Angle of 60°)
b2=(Transmittance of Incidence Ray at 550 nm at Polar Angle of 60°)/(Transmittance of Incidence Ray at 700 nm at Polar Angle of 60°)

[3] In the infrared control film according to [1] or [2], it is preferable that the liquid crystal layer includes at least one liquid crystal compound and at least one chiral agent.

[4] In the infrared control film according to any one of [1] to [3], it is preferable that a haze of the infrared control film at −20° C. is 3% or lower.

[5] In the infrared control film according to any one of [1] to [4], it is preferable that the liquid crystal layer includes three or more liquid crystal compounds.

[6] In the infrared control film according to any one of [1] to [5], it is preferable that the liquid crystal layer has a phase transition point between a smectic liquid crystal phase and a cholesteric liquid crystal phase in a temperature range of higher than 25° C. and 40° C. or lower.

[7] In the infrared control film according to any one of [1] to [6], it is preferable that the liquid crystal layer is in a smectic liquid crystal phase in a temperature range of −20° C. to 25° C.

[8] In the infrared control film according to any one of [1] to [7], it is preferable that the liquid crystal layer includes a disk-shaped liquid crystal compound represented by the following Formula (1).

$$D(\text{-}L\text{-}P)n \qquad \text{Formula (1)}$$

In Formula (1), D represents a disk-shaped core, L represents a divalent linking group, P represents a polymerizable group or an alkyl chain having 2 to 10 carbon atoms, and n represents an integer of 4 to 12.

[9] In the infrared control film according to any one of [1] to [8], it is preferable that the liquid crystal layer includes an alignment start temperature lowering agent.

[10] In the infrared control film according to any one of [1] to [9], it is preferable that a thickness of the liquid crystal layer is 15 μm or less.

[11] It is preferable that the infrared control film according to any one of [1] to [10] further comprises an aligned film that is in direct contact with the liquid crystal layer.

[12] In the infrared control film according to [11], it is preferable that the aligned film is a photo-alignment film.

[13] In the infrared control film according to [11] or [12], it is preferable that a thickness of the aligned film is 3.0 μm or less.

[14] A roll which is obtained by winding the infrared control film according to any one of [1] to [13] in a roll shape.

[15] A window comprising:
the infrared control film according to any one of [1] to [13].

According to the present invention, an infrared control film can be provided in which an infrared light transmittance changes depending on the temperature, a tint in a front direction is excellent, and durability is high.

According to the present invention, a window including an infrared control film can be provided in which an infrared light transmittance changes depending on the temperature, a tint in a front direction is excellent, and durability is high.

DESCRIPTION OF THE PREFERRED EMBODIMENTS

Figure 1:
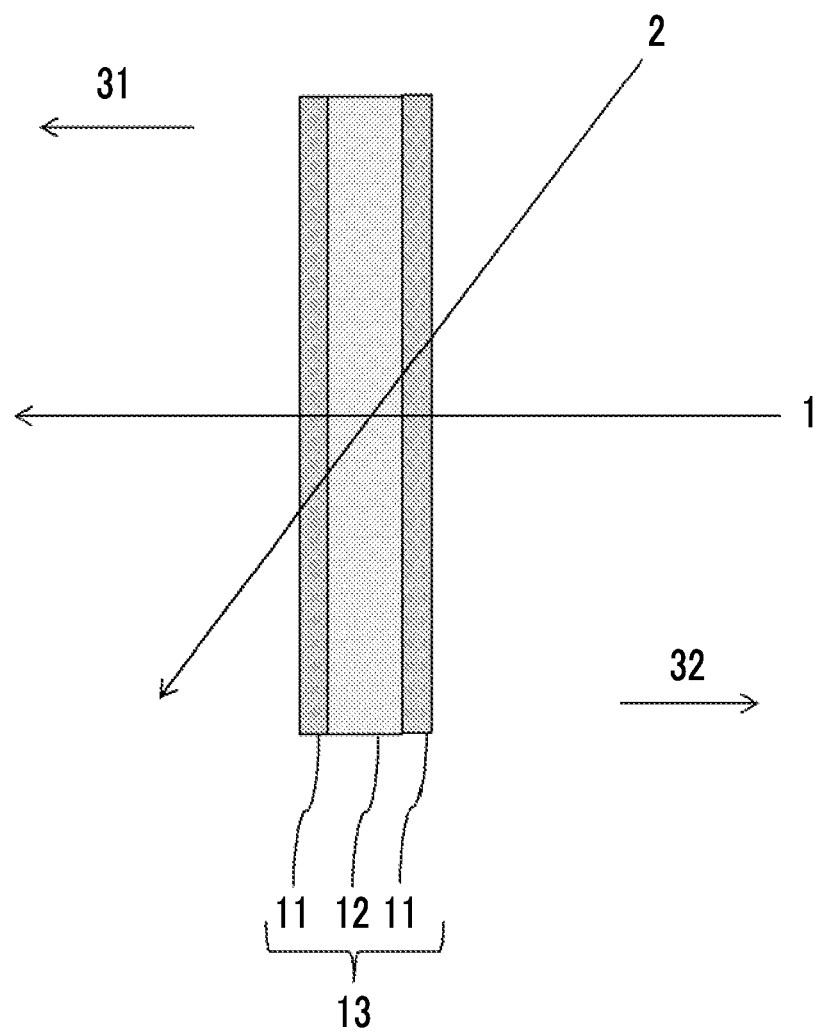
FIG. 1 is a schematic diagram showing a cross-section of an example of an infrared control film according to the present invention.

Hereinafter, the details of the present invention will be described. The following description regarding components has been made based on a representative embodiment of the present invention. However, the present invention is not limited to the embodiment. In this specification, numerical ranges represented by "to" include numerical values before and after "to" as lower limit values and upper limit values.

In addition, in this specification, numerical values, numerical ranges, and qualitative expressions (for example, the expression "the same" or "equal to") representing optical characteristics of each member imply numerical values, numerical ranges, and properties including errors which are generally allowable in the technical field regarding a liquid crystal display device or a member used in a liquid crystal display device.

In addition, in this specification, "front" represents a normal direction perpendicular to an infrared control film surface.

In this specification, a measurement wavelength is 550 nm unless specified otherwise.

In addition, in this specification, an angle (for example, an angle such as "90°") and a relationship thereof (for example, "perpendicular", "parallel", or "intersecting at 45°") are in a range including errors which are generally allowable in the technical field. For example, an angle is in a range of the exact angle±less than 10°, and the error from the exact angle is preferably 5° or less and more preferably 3° or less.

[Infrared Control Film]

An infrared control film according to the present invention includes:
at least one liquid crystal layer; and
two substrates each of which includes at least one of an ultraviolet absorber or a colorant,
in which the liquid crystal layer is disposed between the two substrates,
the substrate includes 0.001 mass % or higher of the ultraviolet absorber or the colorant with respect to a total mass of the substrate,
a transmittance of the infrared control film at 0° C. with respect to an incidence ray at 1000 nm at a polar angle of 0° is higher than 70%,
a transmittance of the infrared control film at 40° C. with respect to an incidence ray at 1000 nm at a polar angle of 0° is lower than 60%, and
the following Expression (1-a) and the following Expression (1-b) are satisfied, $$0.8 < a1 < 1.2 \qquad \text{Expression (1-a)},$$

$$0.8 < b1 < 1.2 \qquad \text{Expression (1-b)},$$

a1=(Transmittance of Incidence Ray at 450 nm at Polar Angle of 0°)/(Transmittance of Incidence Ray at 550 nm at Polar Angle of 0°), and b1=(Transmittance of Incidence Ray at 550 nm at Polar Angle of 0°)/(Transmittance of Incidence Ray at 700 nm at Polar Angle of 0°).

In the infrared control film according to the present invention having the above-described configuration, an infrared light transmittance changes depending on the temperature, a tint in a front direction (hereinafter, also referred to as "front-direction tint") is excellent, and durability is high. The infrared control film according to the present invention allows transmission of a sufficient amount of visible light, and a light transmittance thereof at a specific wavelength changes at about room temperature. For example, in the summer in which the air temperature is high, heat rays are sufficiently reflected, and the cooling load is reduced. In addition, in the winter in which the air temperature is low, it is preferable that the heating load is reduced while securing heat rays. In a case where the infrared control film according to the present invention is used in a window of a building or the like, sufficient power-saving can be achieved.

Hereinafter, a preferable aspect of the infrared control film according to the present invention will be described.

<Configuration>

The configuration of the infrared control film according to the present invention will be described with reference to the drawings.

FIG. 1 is a schematic diagram showing a cross-section of an example of the infrared control film according to the present invention.

An infrared control film 13 shown in FIG. 1 includes a liquid crystal layer 12 and two substrates 11, and the liquid crystal layer 12 is disposed between the two substrates 11.

The liquid crystal layer 12 included in the infrared control film 13 may be formed of two or more layers but is preferably formed of one layer.

The number of the substrates 11 included in the infrared control film 13 is at least two and may be three or more, but is preferably two.

<Characteristics>

Regarding an energy distribution of a wavelength range of heat rays in sunlight, the energy is concentrated on a short-wavelength range close to a visible light range, and the sunlight energy is not substantially present in a wavelength range of more than 2000 nm. Accordingly, in a case where the air temperature, for example, in the summer, a reflection center wavelength of selective reflection of the infrared control film (preferably a cholesteric liquid crystal phase) is preferably in a relatively short-wavelength infrared range close to visible light range that is a range of 750 nm to 1200 nm. The infrared control film according to the present invention controls transmittance or reflectivity of infrared light having a wavelength of 1000 nm.

A transmittance of the infrared control film 13 according to the present invention at 0° C. with respect to an incidence ray at 1000 nm at a polar angle of 0° (an incidence ray at a polar angle of 0° in a direction 1 of FIG. 1) is preferably higher than 70%, more preferably higher than 75% and more preferably higher than 80%.

A transmittance of the infrared control film 13 according to the present invention at 25° C. (preferably higher than 0° C. and 25° C. or lower) with respect to the incidence ray at 1000 nm at a polar angle of 0° (the incidence ray at a polar angle of 0° in the direction 1 of FIG. 1) is preferably higher than 70%, more preferably higher than 75%, and still more preferably higher than 80%. With this configuration, in a case where the air temperature is in a range (for example, 25° C. or lower) where a person is not likely to feel hot, the infrared control film automatically enters a state where it allows transmission of infrared light.

A transmittance of the infrared control film 13 according to the present invention at 40° C. (preferably higher than 25° C. and 80° C. or lower) with respect to the incidence ray at 1000 nm at a polar angle of 0° (the incidence ray at a polar angle of 0° in the direction 1 of FIG. 1) is lower than 60%, preferably lower than 55%, and more preferably lower than 50%. With this configuration, in a case where the air temperature is in a range (for example, higher than 25° C.) where a person is likely to feel hot, the infrared control film automatically enters a state where it can reflect infrared light.

In the infrared control film according to the present invention, it is not necessary to provide a heat control device. However, optionally, a well-known heat control device may be optionally provided so as to switch between the state where the infrared control film allows transmission of infrared light and the state where the infrared control film can reflect infrared light at an appropriate timing.

A transmittance of the infrared control film 13 according to the present invention at 0° C. with respect to an incidence ray at 1000 nm at a polar angle of 60° (an incidence ray at a polar angle of 60° in a direction 2 of FIG. 1) is preferably higher than 60%, more preferably higher than 65%, and still more preferably higher than 70%.

A transmittance of the infrared control film 13 according to the present invention at 25° C. (preferably higher than 0° C. and 25° C. or lower) with respect to the incidence ray at 1000 nm at a polar angle of 60° (the incidence ray at a polar angle of 60° in the direction 2 of FIG. 1) is preferably higher than 60%, more preferably higher than 65%, and still more preferably higher than 70%.

A transmittance of the infrared control film 13 according to the present invention at 40° C. (preferably higher than 25° C. and 80° C. or lower) with respect to the incidence ray at 1000 nm at a polar angle of 60° (the incidence ray at a polar angle of 60° in the direction 2 of FIG. 1) is lower than 55%, preferably lower than 53%, and more preferably lower than 50%.

The infrared control film according to the present invention satisfies the following Expression (1-a) and the following Expression (1-b).

$$0.8 < a1 < 1.2 \quad \text{Expression (1-a)}$$

$$0.8 < b1 < 1.2 \quad \text{Expression (1-b)}$$

$a1$=(Transmittance of Incidence Ray at 450 nm at Polar Angle of 0°)/(Transmittance of Incidence Ray at 550 nm at Polar Angle of 0°)

$b1$=(Transmittance of Incidence Ray at 550 nm at Polar Angle of 0°)/(Transmittance of Incidence Ray at 700 nm at Polar Angle of 00)

$0.85 < a1 < 1.15$ is preferable, and $0.90 < a1 < 1.10$ is more preferable.

$0.85 < b1 < 1.15$ is preferable, and $0.90 < b1 < 1.10$ is more preferable.

It is preferable that the infrared control film according to the present invention satisfies the following Expression (2-a) and the following Expression (2-b).

$$0.8 < a2 < 1.2 \quad \text{Expression (2-a)}$$

$$0.8 < b2 < 1.2 \quad \text{Expression (2-b)}$$

$a2$=(Transmittance of Incidence Ray at 450 nm at Polar Angle of 60°)/(Transmittance of Incidence Ray at 550 nm at Polar Angle of 60°)

$b2$=(Transmittance of Incidence Ray at 550 nm at Polar Angle of 60°)/(Transmittance of Incidence Ray at 700 nm at Polar Angle of 60°)

$0.85 < a2 < 1.15$ is preferable, and $0.90 < a2 < 1.10$ is more preferable.

$0.85 < b2 < 1.15$ is preferable, and $0.90 < b2 < 1.10$ is more preferable.

It is preferable that the respective transmittances a1, a2, b1, and b2 of the infrared control film according to the present invention are in the above-described ranges before and after a heat cycle durability test (500 cycles of temperature condition changes between −35° C.×1 hour and 75° C.×1 hour).

A haze (having the same definition as a haze value) of the infrared control film according to the present invention at 25° C. is preferably 1% or lower, more preferably 0.9% or lower, and still more preferably 0.8% or lower. It is preferable that the haze of the infrared control film according to the present invention at 25° C. is in the above-described range before and after the heat cycle durability test (500 cycles of temperature condition changes between −35° C.×1 hour and 75° C.×1 hour).

A haze of the infrared control film according to the present invention at −20° C. is preferably 3% or lower, more preferably 2.5% or lower, and still more preferably 2.0% or lower.

<Substrate>

The infrared control film according to the present invention includes the substrate that includes at least one of an ultraviolet absorber or a colorant, and the substrate includes 0.001 mass % or higher of the ultraviolet absorber or the colorant with respect to the total mass of the substrate. Since the substrate includes 0.001 mass % or higher of the ultraviolet absorber or the colorant with respect to the total mass of the substrate, the tint in the front direction is excellent and the durability is high in the infrared control film. More preferably, tint in an oblique direction (hereinafter, also referred to as "oblique-direction tint") is also excellent in the infrared control film.

In a case where the substrate includes the ultraviolet absorber, the property in which the infrared light transmittance changes depending on the temperature in the heat cycle durability test is not likely to be lost, and the front-direction tint, the oblique-direction tint, and the haze are excellent after the durability test, which is preferable.

In a case where the substrate includes the colorant, likewise, the property in which the infrared light transmittance changes depending on the temperature in the heat cycle durability test is not likely to be lost, and the front-direction tint, the oblique-direction tint, and the haze are excellent after the durability test, which is preferable. In a case where the haze after the durability test is improved using the colorant, it is preferable that the amount of the colorant included in the substrate is large to absorb light in an ultraviolet range.

In a case where the substrate includes both the ultraviolet absorber and the colorant, the total mass of the ultraviolet absorber and the colorant is preferably 0.001 mass % or higher with respect to the total mass of the substrate.

As the substrate, a light-transmitting substrate or a film can be used. It is preferable that a film is used as the substrate from the viewpoints of easily winding the infrared control film in a roll shape, easily attaching the infrared control film to an existing window, and easily providing the infrared control film to a curved member.

It is preferable that a transparent substrate is used as the substrate. For example, a single plate having optical characteristics in which a transmittance at 380 to 2000 nm is 90% or higher is preferably used. As a method of measuring the transmittance of the substrate, the same method of measuring the transmittance of the infrared control film can be used.

Examples of the light-transmitting substrate include a well-known quartz glass.

The film is not particularly limited, and a polymer film including one of various polymer materials (including both polymers and resins) as a major component can be used. A film that includes a polymer or a resin as a major component having excellent properties such as light-transmitting property, mechanical strength, heat stability, water shielding property, or isotropy is preferable. Examples of the film include: a polycarbonate polymer; a polyester polymer such as polyethylene terephthalate or polyethylene naphthalate; an acrylic polymer such as polymethyl methacrylate; and a styrene polymer such as polystyrene or an acrylonitrile-styrene copolymer. Other examples of the film include: a polyolefin such as polyethylene or polypropylene; a polyolefin polymer such as an ethylene-propylene copolymer; a vinyl chloride polymer; an amide polymer such as nylon or an aromatic polyamide; an imide polymer; a sulfone polymer; a polyethersulfone polymer; a polyether ether ketone polymer; a polyphenylene sulfide polymer; a vinylidene chloride polymer; a vinyl alcohol polymer; a vinyl butyral polymer; an arylate polymer; a polyoxymethylene polymer; an epoxy polymer; and a polymer that is obtained by mixing the above-described polymers. In addition, the polymer film of the present invention can be formed as a cured layer of an ultraviolet curable or thermally curable resin such as an acrylic resin, a urethane resin, an acrylic urethane resin, an epoxy resin, or a silicone resin.

As the film, a film including at least one selected from the group consisting of cellulose acylate, cyclic olefin, an acrylic resin, a polyethylene terephthalate resin, and a polycarbonate resin as a major component is preferably used.

As the film, a commercially available product may be used, examples thereof include ZEONEX and ZEONOR (manufactured by Zeon Corporation) and ARTON (manufactured by JSR Corporation). In addition, various commercially available cellulose acylate films such as "TD40UL" (manufactured by Fuji Film Co., Ltd.) can also be used.

As the film, a film that is formed using any one of a solution film forming method and a melt film forming method can also be used. The thickness of the film is preferably 10 to 1000 μm, more preferably 40 to 500 μm, and still more preferably 40 to 200 μm.

—Ultraviolet Absorber—

Examples of the ultraviolet absorber used in the substrate include an oxybenzophenone compound, a benzotriazole compound, a salicylic acid ester compound, a benzophenone compound, a cyanoacrylate compound, and a nickel complex salt compound. Among these, a benzotriazole compound having reduced discoloration is preferable. In addition, an ultraviolet absorber described in JP1998-182621A (JP-H10-182621A) and JP1996-337574A (JP-H8-337574A) or a polymer ultraviolet absorber described in JP1994-148430A (JP-H6-148430A) is also preferably used. In a case where the cellulose acylate film according to the present invention is used as the substrate film, as the ultraviolet absorber, an ultraviolet absorber capable of absorbing ultraviolet light having a wavelength of 370 nm or shorter is preferable from the viewpoint of durability (durability prevention) of the liquid crystal layer, and an ultraviolet absorber that absorbs less visible light having a wavelength of 400 nm or longer is preferable from the viewpoint of improving the tint and the haze.

Two or more kinds of ultraviolet absorbers may be used.

Specific examples of the benzotriazole ultraviolet absorber useful in the present invention include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole, 2,2'-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2-(2H-benzotriazol-2-yl)-6-(linear and branched dodecyl)-4-methylphenol, a mixture of octyl-3-[3-tert-butyl-4-hydroxy-5-(chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate.

However, the benzotriazole ultraviolet absorber is not limited to the examples. In addition, as a commercially available product, TINUVIN 109, TINUVIN 171, or TINUVIN 326 (all of which are manufactured by BASF SE) can be preferably used.

The content of the ultraviolet absorber with respect to the total mass of the substrate is preferably 0.1 mass % or higher, more preferably 0.1 to 5.0 mass %, still more preferably 0.5 to 2.0 mass %, and still more preferably 0.8 to 2.0 mass %.

In a case where the film including the ultraviolet absorber or the colorant is formed using a solution film forming method, it is preferable that the ultraviolet absorber or the colorant is added to a dope that is a solution of a polymer as a major component. As a method of adding the ultraviolet absorber or the colorant to the dope, the ultraviolet absorber or the colorant may be added after being dissolved in an organic solvent such as an alcohol, methylene chloride, or dioxolane, or may be directly added to the dope composition. An ultraviolet absorber or a colorant that is not dissolved in an organic solvent, for example, an inorganic powder may be added to the dope after being dispersed in an organic solvent and a polymer as a major component using a dissolver or a sand mill.

—Colorant—

The colorant used in the substrate is not particularly limited, and a well-known colorant can be used. As the colorant used in the present invention, for example, one kind or a mixture of two or more kinds selected from various well-known dyes and pigments of the related art can be used. The colorant is preferably a pigment from the viewpoint of light fastness.

The colorant is preferably a colorant that reduces a green light transmittance of the substrate from the viewpoint of improving the front-direction tint and the oblique-direction tint. In particular, in a case where the infrared light transmittance changes depending on the temperature using phase transition between the smectic liquid crystal phase and the cholesteric liquid crystal phase, as the temperature increases, not only the amount of reflection of infrared light but also the amount of reflection of visible light in a long wavelength range (for example, red light) tend to increase. In a case where visible light in a long wavelength range (for example red light) is reflected, it is expected that green light or blue light accounts for a large amount of light that transmits through the infrared control film. As a result of investigation, the present inventors found that the transmittance of green light transmitting through the infrared control film increases. Therefore, by reducing the green light transmittance using the colorant that reduces the green light transmittance of the substrate, the front-direction tint and the oblique-direction tint of the light transmitting through the infrared control film can be improved.

In addition, a mechanism for improving the oblique-direction tint of the light transmitting through the infrared control film is the same as a mechanism for improving the front-direction tint thereof. However, in light that is incident obliquely from the liquid crystal layer, in principle, the reflection wavelength (for example, reflection center wavelength) of the cholesteric liquid crystal phase is shifted to the short wavelength side, and not only the amount of reflection of infrared light but also the amount of reflection of visible light in a long wavelength range (for example, red light) further increase. Therefore, the improvement of the oblique-direction tint is more difficult than the improvement of the front-direction tint. In a preferable aspect of the infrared control film according to the present invention, not only the front-direction tint but also the oblique-direction tint can be improved.

As the colorant that reduces the green light transmittance of the substrate, for example, colorant described in JP2009-139616A and JP2011-122107A can be used. Among these, preferred colorant are as follows:

Colour Index Generic Name (C.I.) Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (Indian Red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 254, 269, and the like; and C.I. Pigment Violet 19.

In particular, C.I. Pigment Red 254 or C.I. Pigment Red 122 is preferably used.

Specifically, it is more preferable to use the following colorants.

Colorant 1: C.I. Pigment Red 122 (manufactured by BASF SE)

Colorant 2: C.I. Pigment Red 254 (manufactured by Tokyo Chemical Industry Co., Ltd.)

The content of the colorant with respect to the total mass of the substrate is preferably 0.001 mass % or higher, more preferably 0.002 to 5.0 mass %, still more preferably 0.003 to 2.0 mass %, and still more preferably 0.008 to 2.0 mass %.

<Liquid Crystal Layer>

The infrared control film according to the present invention includes at least one liquid crystal layer.

The liquid crystal layer may be disposed on the substrate directly or with an aligned film interposed therebetween. It is preferable that the liquid crystal layer is disposed on at least one substrate with the aligned film interposed therebetween.

(Characteristics of Liquid Crystal Layer)

In the infrared control film according to the present invention, it is preferable that the liquid crystal layer has a phase transition point between the smectic liquid crystal phase and the cholesteric liquid crystal phase in a temperature range of higher than 25° C. and 40° C. or lower from the viewpoints of maintaining transparency and simultaneously realizing reflection of infrared light and transparency at a high temperature. It is more preferable that the liquid crystal layer has a phase transition point between the smectic liquid crystal phase and the cholesteric liquid crystal phase in a temperature range of 25° C. to 35° C., and it is still more preferable that the liquid crystal layer has a phase transition point between the smectic liquid crystal phase and the cholesteric liquid crystal phase in a temperature range of 25° C. to 30° C.

In general, as where the temperature of the smectic liquid crystal phase decreases, the smectic liquid crystal phase becomes vitrified, and in a case where this state is fixed, crystallization may occur at a certain temperature. For example, by preventing crystallization of the liquid crystal compound in the winter, a problem of transparency loss caused by an increase in turbidity (increase in haze) of the infrared control film can be suppressed. Accordingly, it is preferable that the liquid crystal layer has a sufficiently low crystallization temperature of lower than −40° C., or it is preferable that the crystallization of the liquid crystal layer does not occur such that the smectic liquid crystal phase is not vitrified. In the infrared control film according to the present invention, from the viewpoint of maintaining the smectic liquid crystal phase (so as to prevent crystallization) even at a low temperature (for example, about −40° C.) in order to maintain transparency even in the cold region, it is preferable that the liquid crystal layer has in the smectic liquid crystal phase in a temperature range of −20° C. to 25°

C., and it is more preferable that the liquid crystal layer has in the smectic liquid crystal phase in a temperature range of −40° C. to 25° C.

(Thickness of Liquid Crystal Layer)

In the infrared control film according to the present invention, the thickness of the liquid crystal layer is preferably 15 µm or less, more preferably 0.1 to 5 µm, still more preferably 0.5 µm or more and less than 4 µm, and still more preferably 1.0 µm or more and less than 3 µm. In a case where the thickness of the liquid crystal layer is small, tinting caused by the liquid crystal layer can be suppressed, and the front-direction tint and the oblique-direction tint of the infrared control film can be improved.

(Material of Liquid Crystal Layer)

It is preferable that a material of the liquid crystal layer is a liquid crystal composition including a liquid crystal compound. As the liquid crystal composition used to form the liquid crystal layer, for example, a liquid crystal composition including at least one liquid crystal compound and at least one alignment assistant may be used. In addition, the liquid crystal composition may further include other components such as a polymerization initiator, a sensitizer, or a solvent.

Hereinafter, each of the materials will be described in detail.

—Liquid Crystal Compound—

The liquid crystal compound can be appropriately selected according to the design of the liquid crystal layer in which the infrared light transmittance changes depending on the temperature, for example, the phase transition point between the smectic liquid crystal phase and the cholesteric liquid crystal phase.

In the infrared control film according to the present invention, the liquid crystal layer may include one or more liquid crystal compounds and preferably three or more liquid crystal compounds from the viewpoint of obtaining the infrared control film in which the infrared light transmittance changes depending on the temperature, the tint in the front direction is excellent, and the durability is high.

In general, regarding liquid crystals, three types of molecular arrangements including the cholesteric liquid crystal phase, the smectic liquid crystal phase, and the nematic liquid crystal phase are known. The cholesteric liquid crystal phase has a property in which molecules are arranged in a helical shape and in which light having the same wavelength as a helical pitch is reflected. This property is called selective reflection. In the present invention, for example, only heat rays in sunlight are reflected using this selective reflection, and power-saving is realized.

In a case where only light having completely the same wavelength as the pitch of the cholesteric liquid crystal phase is reflected in the selective reflection, only a small portion of heat rays is reflected but is in a certain wavelength range in the actual selective reflection. Therefore, heat rays in substantially all the wavelength range can be reflected. It is reported that the wavelength range of the light reflected can be approximated to the product of birefringence as optical anisotropy of the liquid crystal compound and the center wavelength of the selective reflection (H. F. Gleeson, H. J. Coles, Mol. Cryst. Liq. Cryst., 1709~1734 (1989))

On the other hand, in the smectic liquid crystal phase, molecules are arranged in a certain direction, and the centers of gravity of molecules are also ordered to some extent. The smectic liquid crystal phase can be classified into, for example, smectic A1, smectic A2, smectic B, smectic C, and smectic E based on a difference in the order of the center of gravity and a relationship between the order of the center of gravity and the arrangement direction of molecules. In the present invention, any smectic liquid crystal phase can be preferably used. The smectic liquid crystal phase does not exhibit selective reflection unlike the cholesteric liquid crystal phase.

Preferable examples of the liquid crystal compound used in the present invention include one liquid crystal compound or a plurality of liquid crystal compounds that can adopt both the cholesteric liquid crystal phase and the smectic liquid crystal phase. Most of the liquid crystal compounds form the smectic liquid crystal phase at a low temperature and form the cholesteric liquid crystal phase at a high temperature. Accordingly, in this case, as the temperature of the cholesteric liquid crystal phase decreases, a change to the smectic liquid crystal phase, that is, phase transition occurs. This phase transition is reversible or irreversible. It is preferable that the phase transition of the liquid crystal compound used in the present invention is reversible from the viewpoints of preventing the cholesteric liquid crystal phase from being fixed at a low temperature and preventing light in a wavelength range of heat rays from being reflected even in a case where it is desired to secure the light in a wavelength range of heat rays, for example, in the winter.

As the liquid crystal compound capable of phase transition between the smectic liquid crystal phase and the cholesteric liquid crystal phase, a liquid crystal compound having a desired phase transition point between the smectic liquid crystal phase and the cholesteric liquid crystal phase may be used alone, or a combination of two or more liquid crystal compounds having a desired phase transition point between the smectic liquid crystal phase and the cholesteric liquid crystal phase may be used. Examples of the liquid crystal compound used in the liquid crystal layer include liquid crystal compounds that are known as a smectic liquid crystal compound or a cholesteric compound (for example, a rod-shaped liquid crystal compound or a disk-shaped liquid crystal compound described below) at 25° C. Among these, a liquid crystal compound having reduced tinting is preferable from the viewpoint of improving the front-direction tint and the oblique-direction tint of the infrared control film.

Hereinafter, a preferable aspect of the liquid crystal compound used in the liquid crystal layer will be described.

——Smectic Liquid Crystal Compound——

The smectic liquid crystal compound refers to a compound that can exhibit smectic liquid crystal properties in the formed liquid crystal layer.

The smectic liquid crystal compound is preferably a compound at least three ring structures selected from the group consisting of a benzene ring and a cyclohexane ring because smectic properties are easily exhibited by pseudo phase separation of rigid mesogen and a flexible side chain and sufficient rigidity is exhibited.

In addition, from the viewpoint of imparting moisture-heat resistance to the liquid crystal layer, the smectic liquid crystal compound is a compound having two or more polymerizable groups (for example, a (meth)acryloyl group, a vinyl group, a styryl group, or an allyl group).

"(meth)acryloyl group" represents either or both of an acryloyl group and a methacryloyl group.

Specific examples of the smectic liquid crystal compound include compounds represented by the following Formulae L-1, L-3, and L-6.

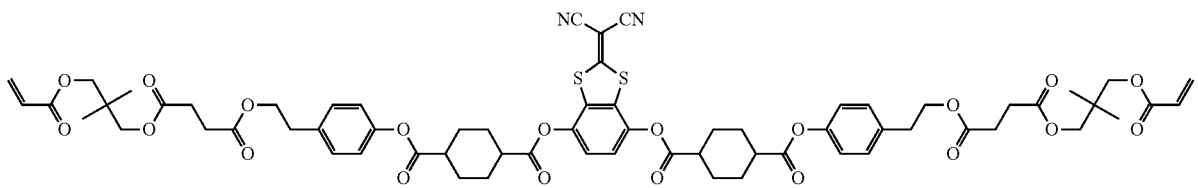

L-1

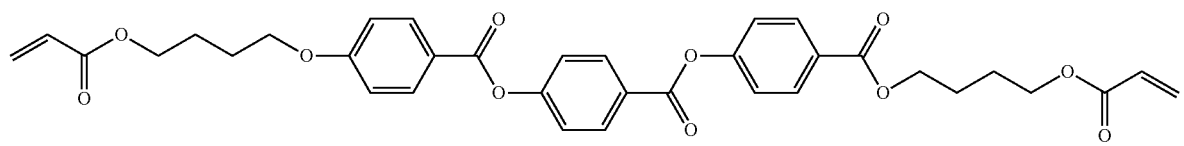

L-3

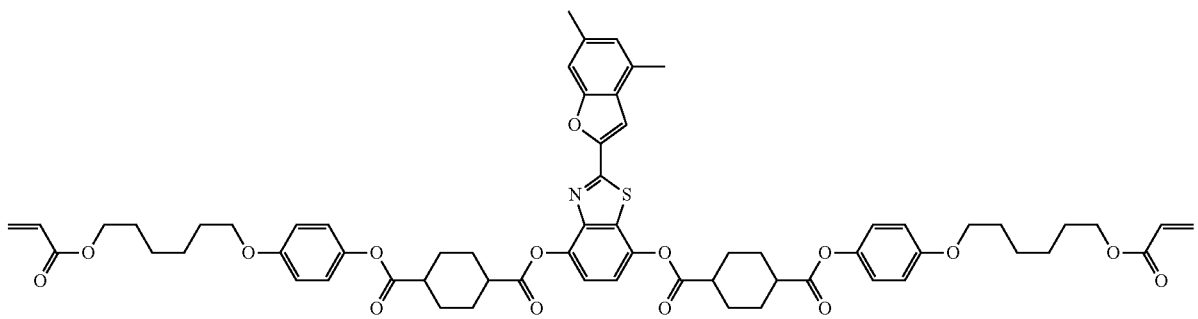

L-6

The smectic liquid crystal compound is preferably a compound having a structure represented by the following Formula (1) because the alignment of the liquid crystal layer is further improved due to an electronic interaction between liquid crystal molecules.

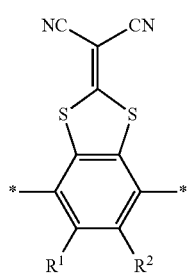

(1)

In Formula (1), * represents a binding site, and $R^1$ and $R^2$ each independently represents a hydrogen atom or an alkyl group having 1 to 6 carbon atoms.

Preferable examples of the compound having a structure represented by Formula (1) include a compound represented by Formula L-1 in which both $R^1$ and $R^2$ in Formula (1) represent a hydrogen atom.

The liquid crystal layer may include a liquid crystal compound other than the smectic liquid crystal compound.

As the other liquid crystal compound, for example, a nematic liquid crystal compound can be used, and specific examples include compounds represented by the following Formnnulae L-2 and L-4 used in Examples below.

In a case where the liquid crystal layer includes the smectic liquid crystal compound and the other liquid crystal compound, a content ratio of the smectic liquid crystal compound is preferably at least 35 mass % or higher with respect to the total mass of the smectic liquid crystal compound and the other liquid crystal compound.

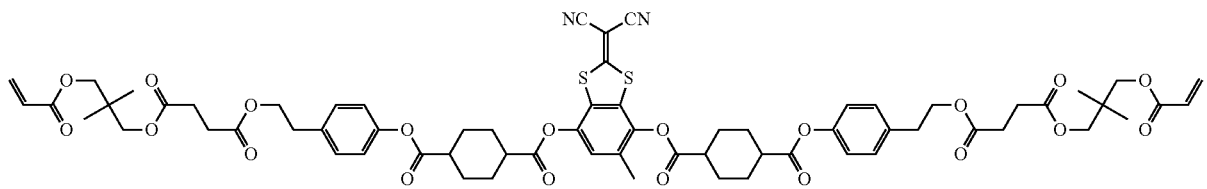

L-2

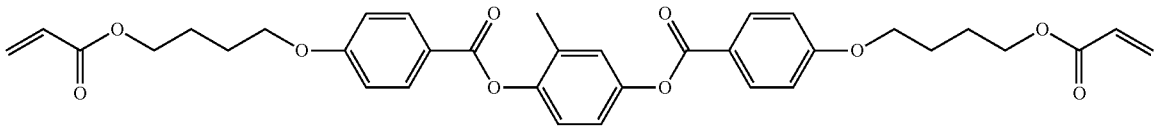

L-4

——Rod-Shaped Liquid Crystal Compound——

Examples of the rod-shaped liquid crystal compound include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal compounds but also high molecular weight liquid crystal compounds can be used.

The alignment of the rod-shaped liquid crystal compound may be fixed by polymerization. The polymerizable liquid crystal compound having a polymerizable group can be obtained by introducing a polymerizable group into the liquid crystal compound. Examples of the polymerizable group include an unsaturated polymerizable group, an epoxy group, and an aziridinyl group. As the polymerizable group, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), JP2001-328973A, JP2014-198815A, and JP2014-198814A. Further, as the rod-shaped liquid crystal compound, for example, compounds described in JP1999-513019A (JP-H11-513019A) and JP2007-279688A can be preferably used.

Two or more polymerizable liquid crystal compounds may be used in combination. In a case where two or more polymerizable liquid crystal compounds are used in combination, the alignment temperature can be decreased.

Specific examples of the rod-shaped liquid crystal compound include the following compounds. Among these, a liquid crystal compound 8CB, a liquid crystal compound 12CB, a liquid crystal compound A, a liquid crystal compound B, a liquid crystal compound C, or a chiral liquid crystal compound is preferable from the viewpoints of reducing tinting of the liquid crystal compound.

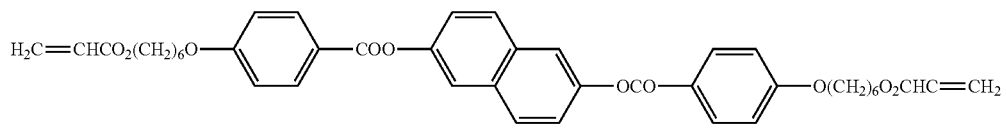

(1)

(2)

(3)

(4)

(5)

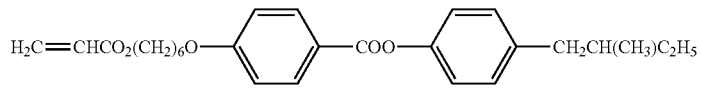

(6)

-continued
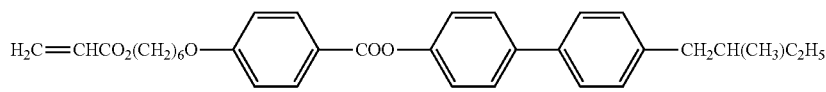
(7)
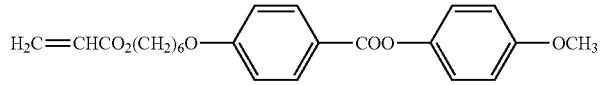
(8)
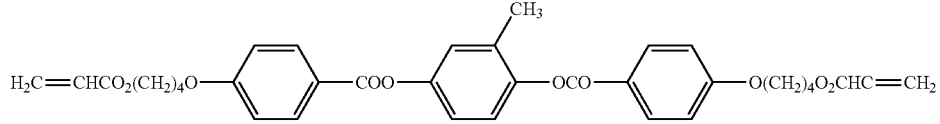
(9)
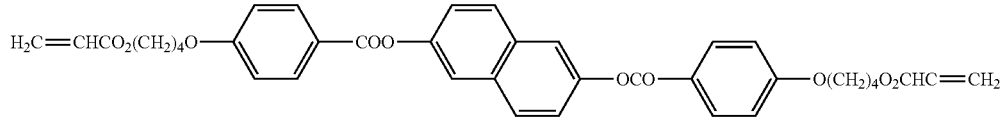
(10)
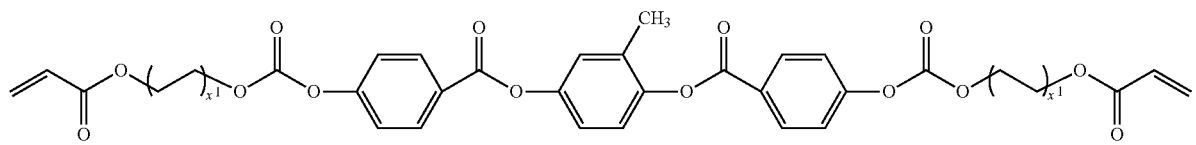
(11)
[In Compound (11), $X^1$ represents an integer of 2 to 5.]
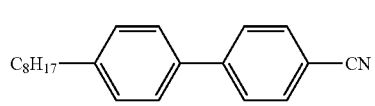
8CB
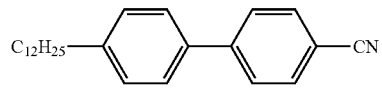
12CB
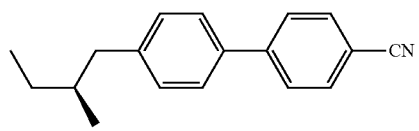
Chiral Liquid Crystal
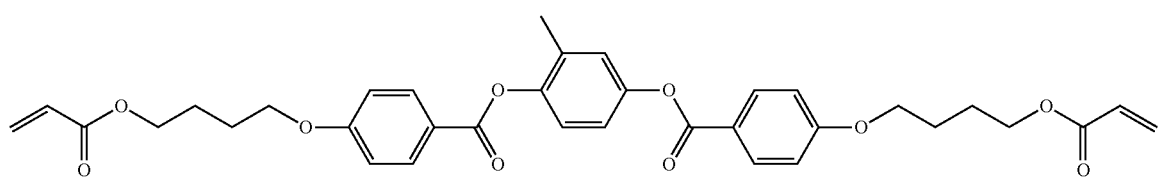
A
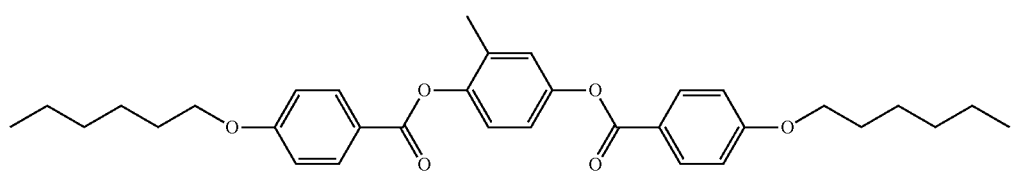
B
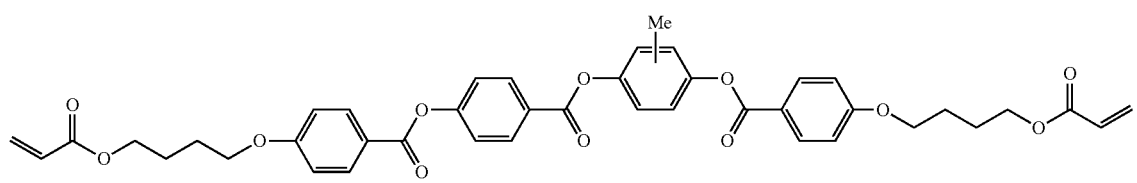
C

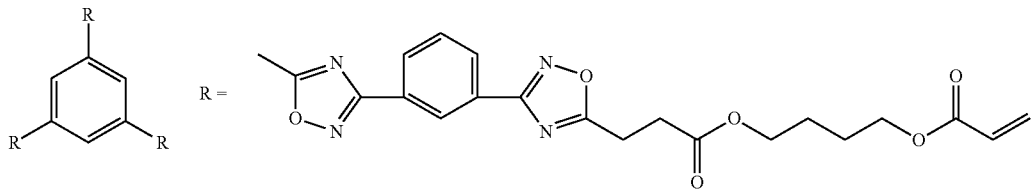

D

——Disk-Shaped Liquid Crystal Compound——

As the disk-shaped liquid crystal compound, for example, compounds described in JP2007-108732A and JP2010-244038A can be preferably used, but the present invention is not limited thereto.

——Disk-Shaped Liquid Crystal Compound Having Reduced Tinting——

Among these, a disk-shaped liquid crystal compound having reduced tinting is preferable from the viewpoint of improving the front-direction tint and the oblique-direction tint of the infrared control film.

Examples of the disk-shaped liquid crystal compound having reduced tinting include a compound represented by Formula (1).

$$D(\text{-}L\text{-}P)n \qquad \text{Formula (1)}$$

In Formula (1), D represents a disk-shaped core, L represents a divalent linking group, P represents a polymerizable group or an alkyl chain having 2 to 10 carbon atoms, and n represents an integer of 4 to 12.

Preferable ranges of the disk-shaped core (D), the divalent linking group (L), and the polymerizable group (P) in Formula (1) are described in paragraphs "0021" to "0122" of JP2007-108732A, specific examples thereof are (D1) to (D15), (L1) to (L25), and (P1) to (P18) described in JP2001-4837A, respectively, and the contents described in JP2001-4837A can be preferably used. The phase transition point of the liquid crystal compound between the discotic nematic liquid crystal phase and the solid phase is preferably 70° C. to 300° C. and more preferably 70° C. to 170° C.

The disk-shaped liquid crystal compound having reduced tinting is less likely to absorb blue light through a benzene ring and to be disclosed yellow. Therefore, the disk-shaped liquid crystal compound is preferable from the viewpoint of suppressing yellow tinting of the infrared control film and improving the front-direction tint and the oblique-direction tint.

In addition, the addition amount of the liquid crystal compound in the liquid crystal layer or in the liquid crystal composition for forming the liquid crystal layer is preferably 75 to 99.9 mass %, more preferably 80 to 99 mass %, and still more preferably 85 to 90 mass % with respect to the solid content mass (mass excluding a solvent) of the liquid crystal composition.

——Chiral Agent——

It is preferable that the liquid crystal layer or the liquid crystal composition for forming the liquid crystal layer includes a chiral agent. In a case where the liquid crystal layer does not include a chiral agent, a liquid crystal compound having chirality can be used in the liquid crystal layer. From the viewpoint of widening the selection range of the liquid crystal compound, it is preferable the liquid crystal layer or the liquid crystal composition for forming the liquid crystal layer includes a chiral agent compared to a case where the liquid crystal compound having chirality is used.

The chiral agent is a compound for adjusting the helical pitch of the cholesteric liquid crystal phase of the liquid crystal layer including the liquid crystal compound. It is preferable that the chiral agent is a molecule having helical twisting power (HTP) with respect to the liquid crystal compound. In the present invention, a well-known chiral agent (for example, Liquid Crystal Device Handbook (No. 42 Committee of Japan Society for the Promotion of Science, 1989), Chapter 3, Article 4-3, chiral agent for TN or STN, p. 199) can be used. In general, the chiral agent includes an asymmetric carbon atom. However, an axially asymmetric compound or a surface asymmetric compound not having an asymmetric carbon atom can be used as the chiral agent. Examples of the axially asymmetric compound or the surface asymmetric compound include binaphthyl, helicene, paracyclophane, and derivatives thereof. The chiral agent may include a polymerizable group. In a case where the chiral agent has a polymerizable group and the rod-shaped liquid crystal compound used in combination also has a polymerizable group, a polymer which includes a repeating unit derived from the rod-shaped liquid crystal compound and a repeating unit derived from the chiral agent can be formed due to a polymerization reaction of the chiral agent having a polymerizable group and the polymerizable rod-shaped liquid crystal compound. In this aspect, it is preferable that the polymerizable group included in the chiral agent is the same as the polymerizable group included in the polymerizable rod-shaped liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

Examples of the chiral agent having high helical twisting power include chiral agents described in JP2010-181852A, JP2003-287623A, JP2002-80851A, JP2002-80478A, and JP2002-302487A, and these chiral agents can be preferably used in the present invention. Further, isomannide compounds having corresponding structures can also be used as isosorbide compounds described in the documents, and isosorbide compounds having corresponding structures can also be used as isomannide compounds described in the documents.

Examples of a chiral site of the chiral agent include an isosorbide skeleton, an isomannide skeleton, and a binaphthol skeleton. A compound having an asymmetric carbon atom, an axially asymmetric compound having an axially asymmetric structure (or not having an asymmetric carbon atom), and a surface asymmetric compound (or a compound not having an asymmetric carbon atom) can be used as the chiral agent. Examples of the axially asymmetric compound or the surface asymmetric compound include binaphthyl, binaphthol, helicene, paracyclophane, and derivatives thereof. In a case where the polymerizable liquid crystal compound is a polymerizable rod-shaped liquid crystal compound, an isosorbide skeleton is more preferable. In a case where the polymerizable liquid crystal compound is a polymerizable discotic liquid crystal compound, a binaphthol skeleton is more preferable.

It is preferable that a chiral agent having a photoisomerization skeleton in a molecule has a polymerizable group. Examples of the chiral agent having a photoisomerization skeleton in a molecule are the same as examples of the polymerizable group included in the polymerizable liquid crystal compound described below.

A proportion of the chiral agent in the liquid crystal compound is preferably 1 to 20 mass % and more preferably 2 to 15 mass %.

As the chiral agent that can be used in the present invention, Paliocolor (registered trade name) LC756 (manufactured by BASF SE) or the following compound can be preferably used.

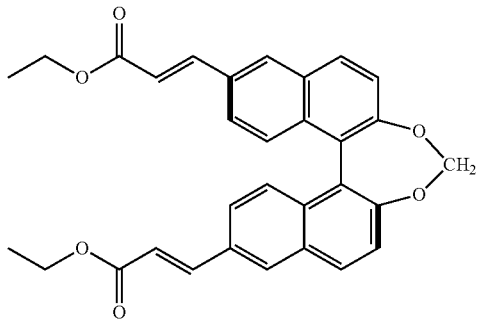

—Alignment Assistant—

It is preferable that an alignment assistant is used from the viewpoints of reducing alignment defects and increasing an alignment speed. Examples of the alignment assistant include an onium salt, a compound including boron, and a fluorine alignment assistant. Among these, an onium salt or a compound including boron is preferable from the viewpoints of improving eccentricity on an aligned film interface (an aligned film-side surface among the surfaces of the liquid crystal layer) and reducing the addition amount.

Examples of the alignment assistant include exemplary compounds described in paragraphs "0092" and "0093" of JP2005-99248A, exemplary compounds described in paragraphs "0076" to "0078" and "0082" to "0085" of JP2002-129162A, exemplary compounds described in paragraphs "0094" and "0095" of JP2005-99248A, and exemplary compounds described in paragraph "0096" of JP2005-99248A.

As the fluorine alignment assistant, compounds described in paragraphs "0082" to "0090" of JP2014-119605A are also preferable.

As the alignment assistant, one kind may be used alone, or two or more kinds may be used in combination.

——Onium Salt (Aligned Film-Side Alignment Assistant)——

It is preferable that an onium salt is added in order to realize homeotropic alignment of the liquid crystal compound having a polymerizable group, in particular, the disk-shaped liquid crystal compound having a polymerizable group. The onium salt is eccentrically present on the aligned film interface and acts to increase a tilt angle in the vicinity of the aligned film interface of liquid crystal molecules.

Two or more onium salts may be used in combination.

As the onium salt, a compound represented by the following Formula (2) is preferable.

$Z-(Y-L-)_nCy^+\cdot X^-$         Formula (2)

In Formula (2), Cy represents an onium group having a 5-membered or 6-membered ring, L, Y, Z, and X have the same definitions and the same preferable ranges as those of $L^{23}$, $L^{24}$, $Y^{22}$, $Y^{23}$, $Z^{21}$, and X in Formulae (2a) and (2b) described below, and n represents an integer of 2 or more.

As the onium group (Cy) having a 5-membered or 6-membered ring, a pyrazolium ring, an imidazolium ring, a triazolium ring, a tetrazolium ring, a pyridinium ring, a pyrazinium ring, a pyrimidinium ring, or a triadinium ring is preferable, and an imidazolium ring or a pyridinium ring is particularly preferable.

It is preferable that the onium group (Cy) having a 5-membered or 6-membered ring has a group having affinity to the aligned film material. In a portion (non-exposed portion) where an acid generator is not decomposed, the onium salt has high affinity to the aligned film material and is eccentrically present in the aligned film interface. On the other hand, in a portion (exposed portion) where an acid generator is decomposed to produce an acidic compound, anions of the onium salt are exchanged, the affinity deteriorates, and the eccentricity in the aligned film interface deteriorates. In a temperature range (room temperature to about 150° C.) where liquid crystals are actually aligned, a hydrogen bond may be formed or may break. Therefore, it is preferable to use a hydrogen bond for affinity. However, the present invention is not limited to this example.

For example, in an aspect in which a polyvinyl alcohol is used as the aligned film material, it is preferable that the onium salt has a hydrogen bond forming group in order to form a hydrogen bond with a hydroxyl group of the polyvinyl alcohol. A theoretical explanation for a hydrogen bond is reported in, for example, H. Uneyama and K. Morokuma, Journal of American Chemical Society, Vol. 99, pp. 1316 to 1332, 1977. Specific examples of the form of a hydrogen bond include a form shown in FIG. 17, p. 98, Intermolecular Force and Surface Force, J. N. Israerachiviri, translated by Kondo Tamotsu and Oshima Hiroyuki, McGraw-Hill (1991). Specific examples of the hydrogen bond include examples described in G. R. Desiraju, Angewandte Chemistry International Edition English, Vol. 34, p. 2311, 1995.

The onium group having a 5-membered or 6-membered ring and a hydrogen bond forming group has a hydrophilic effect, forms a hydrogen bond with an polyvinyl alcohol to improve the surface eccentricity in the aligned film interface, and promotes a function of imparting alignment perpendicular to a polyvinyl alcohol main chain. Preferable examples of the hydrogen bond forming group include an amino group, a carbonamide group, a sulfonamide group, an acid amido group, an ureido group, a carbamoyl group, a carboxyl group, a sulfo group, a nitrogen-containing heterocyclic group (for example, an imidazolyl group, a benzimidazolyl group, a pyrazolyl group, a pyridyl group, a 1,3,5-triazine group, a pyrimidyl group, a pyridazyl group, a quinolyl group, a benzimidazolyl group, a benzothiazolyl group, a succinimide group, a phthalimido group, a maleimide group, an uracil group, a thiouracil group, a barbituric acid group, a hydantoin group, a maleic hydrazide group, an isatin group, and an uramil group). More preferable examples of the hydrogen bond forming group include an amino group and a pyridyl group.

It is also preferable that the onium group having a 5-membered or 6-membered ring includes an atom having a hydrogen bond forming group (for example, a nitrogen atom having an imidazolium ring).

n represents preferably an integer of 2 to 5, more preferably 3 or 4, and still more preferably 3. A plurality of L's and a plurality of Y's may be the same as or different from each other. In a case where n represents 3 or more, the onium salt represented by Formula (2) has three or more 5-membered or 6-membered rings, and thus a strong intermolecular π-π interaction acts with the disk-shaped liquid crystal compound. Therefore, the homeotropic alignment of the disk-shaped liquid crystal compound, in particular, in a polyvinyl alcohol aligned film, homeotropic alignment perpendicular to a polyvinyl alcohol main chain can be realized.

It is more preferable that the onium salt represented by Formula (2) is a pyridinium compound represented by the following Formula (2a) or an imidazolium compound represented by the following Formula (2b).

The compounds represented by Formulae (2a) and (2b) are added in order to control alignment mainly in the aligned film interface of the disk-shaped liquid crystal compound, and acts to increase a tilt angle in the vicinity of the aligned film interface of molecules of the disk-shaped liquid crystal compound.

Formula (2a)

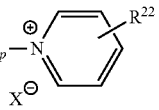

Formula (2b)

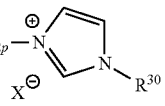

In the formulae, $L^{23}$ and $L^{24}$ each independently represent a divalent linking group.

$L^{23}$ represents preferably a single bond, —O—, —O—CO—, —CO—O—, —C≡C—, —CH═CH—, —CH═N—, —N═CH—, —N═N—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, or —O—CO-AL-CO—O—, and AL represents an alkylene group having 2 to 10 carbon atoms. $L^{23}$ represents preferably a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, or —O—CO-AL-CO—O—, more preferably a single bond or —O—, and most preferably —O—.

$L^{24}$ represents preferably a single bond, —O—, —O—CO—, —CO—O—, —C≡C—, —CH═CH—, —CH═N⁻, —N═CH—, or —N═N—, and more preferably —O—CO— or —CO—O—. In a case where m represents 2 or more, it is more preferable that a plurality of $L^{24}$'s represent —O—CO— and —CO—O—.

$R^{22}$ represents a hydrogen atom, an unsubstituted amino group, or a substituted amino group having 1 to 20 carbon atoms.

In a case where $R^{22}$ represents a dialkyl-substituted amino group, two alkyl groups may be bonded to each other to form a nitrogen-containing heterocycle. At this time, the formed nitrogen-containing heterocycle is preferably a 5-membered or 6-membered ring. $R^{23}$ represents more preferably a hydrogen atom, an unsubstituted amino group, or a dialkyl-substituted amino group having 2 to 12 carbon atoms, and still more preferably a hydrogen atom, an unsubstituted amino group, or a dialkyl-substituted amino group having 2 to 8 carbon atoms. In a case where $R^{23}$ represents an unsubstituted amino group and a substituted amino group, it is preferable that the fourth position of the pyridinium ring is substituted.

X represents an anion.

X represents preferably a monovalent anion. Examples of the anion include a halide ion (for example, a fluorine ion, a chlorine ion, a bromine ion, or an iodine ion) and a sulfonate ion (for example, a methane sulfonate ion, a p-toluenesulfonate ion, or a benzene sulfonate ion).

$Y^{22}$ and $Y^{23}$ each independently represent a divalent linking group having a 5-membered or 6-membered ring as a partial structure.

The 5-membered or 6-membered ring may have a substituent. It is preferable that at least one of $Y^{22}$ or $Y^{23}$ represents a divalent linking group having a 5-membered or 6-membered ring which has a substituent as a partial structure. It is more preferable that $Y^{22}$ and $Y^{23}$ each independently represent a divalent linking group that has a 6-membered ring which may have a substituent as a partial structure. Examples of the 6-membered ring include an aliphatic ring, an aromatic ring (benzene ring), and a heterocycle. Examples of the 6-membered aliphatic ring include a cyclohexane ring, a cyclohexene ring, and a cyclohexadiene ring. Examples of the 6-membered heterocycle include a pyran ring, a dioxane ring, a dithiane ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. Another 6-membered ring or 5-membered ring may be fused to the 6-membered ring.

Examples of the substituent include a halogen atom, a cyano, an alkyl group having 1 to 12 carbon atoms, and an alkoxy group having 1 to 12 carbon atoms. The alkyl group and the alkoxy group may be substituted with an acyl group having 2 to 12 carbon atoms or an acyloxy group having 2 to 12 carbon atoms. The substituent is preferably an alkyl group having 1 to 12 carbon atoms (more preferably 1 to 6 carbon atoms, and still more preferably 1 to 3 carbon atoms). The number of substituents may be two or more. For example, in a case where $Y^{22}$ and $Y^{23}$ represent a phenylene group, the phenylene group may be substituted with one to four alkyl groups having 1 to 12 carbon atoms (more preferably 1 to 6 carbon atoms, and still more preferably 1 to 3 carbon atoms).

m represents 1 or 2 and preferably 2. In a case where m represents 2, a plurality of $Y^{23}$'s and a plurality of $L^{24}$'s may be the same as or different from each other.

$Z^{21}$ represents a monovalent group selected from the group consisting of a halogen-substituted phenyl, a nitro-substituted phenyl, a cyano-substituted phenyl, a phenyl substituted with an alkyl group having 1 to 10 carbon atoms, a phenyl substituted with an alkoxy group having 2 to 10 carbon atoms, an alkyl group having 1 to 12 carbon atoms, an alkynyl group having 2 to 20 carbon atoms, an alkoxy group having 1 to 12 carbon atoms, an alkoxycarbonyl group having 2 to 13 carbon atoms, an aryloxycarbonyl group having 7 to 26 carbon atoms, and an arylcarbonyloxy group having 7 to 26 carbon atoms.

In a case where m represents 2, $Z^{21}$ represents preferably a cyano, an alkyl group having 1 to 10 carbon atoms, or an alkoxy group having 1 to 10 carbon atoms, and more preferably an alkoxy group having 4 to 10 carbon atoms.

In a case where m represents 1, $Z^{21}$ represents preferably an alkyl group having 7 to 12 carbon atoms, an alkoxy group having 7 to 12 carbon atoms, an acyl-substituted alkyl group having 7 to 12 carbon atoms, an acyl-substituted alkoxy group having 7 to 12 carbon atoms, an acyloxy-substituted alkyl group having 7 to 12 carbon atoms, or an acyloxy-substituted alkoxy group having 7 to 12 carbon atoms.

The acyl group is represented by —CO—R, the acyloxy group is represented by —O—CO—R, and R represents an aliphatic group (for example, an alkyl group, a substituted alkyl group, an alkenyl group, a substituted alkenyl group, an alkynyl group, or a substituted alkynyl group) or an aromatic group (for example, an aryl group or a substituted aryl group). R represents preferably an aliphatic group and more preferably an alkyl group or an alkenyl group.

p represents an integer of 1 to 10. p represents preferably 1 or 2. $C_pH_{2p}$ represents a branched alkylene group which may have a branched structure. $C_pH_{2p}$ represents preferably a linear alkylene group (—$(CH_2)_p$—).

In Formula (2b), $R^{30}$ represents a hydrogen atom or an alkyl group having 1 to 12 carbon atoms (more preferably 1 to 6 carbon atoms and still more preferably 1 to 3 carbon atoms).

It is preferable that the compound represented by Formula (2a) or (2b) is a compound represented by the following Formula (2a-I) or (2b-I).

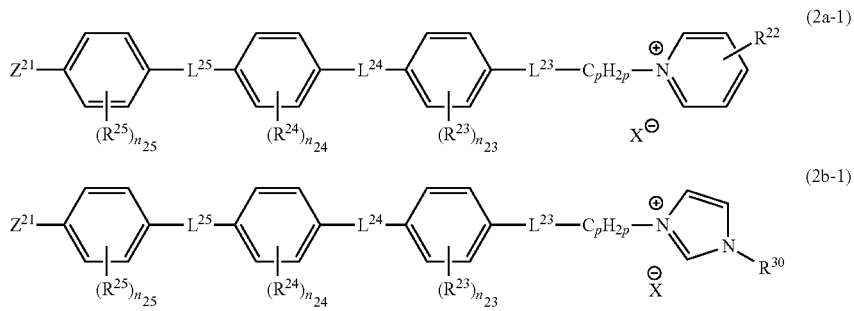

In Formulae (2a-I) and (2b-I), symbols have the same definitions and the same preferable ranges as those of Formula (2). $L^{25}$ has the same definition and the same preferable range as those of $L^{24}$. It is preferable that $L^{24}$ and $L^{25}$ represent —O—CO— or —CO—O—, and it is more preferable that $L^{24}$ represents —O—CO— and $L^{25}$ represents —CO—O—.

$R^{23}$, $R^{24}$, and $R^{25}$ each independently represent preferably an alkyl group having 1 to 12 carbon atoms (more preferably 1 to 6 carbon atoms, and still more preferably 1 to 3 carbon atoms). $n_{23}$ represents 0 to 4, $n_{24}$ represents 1 to 4, and $n_{25}$ represents 0 to 4. It is preferable that $n_{23}$ and $n_{25}$ represent 0 and $n_{24}$ represents 1 to 4 (more preferably 1 to 3).

$R^{30}$ represents preferably an alkyl group having 1 to 12 carbon atoms (more preferably 1 to 6 carbon atoms, and still more preferably 1 to 3 carbon atoms).

Specific examples of the compound represented by Formula (2) include compounds described in paragraphs "0058" to "0061" of JP2006-113500A.

Hereinafter, specific examples of the compound represented by Formula (2) will be shown. In the following formulae, an anion ($X^-$) is not shown.

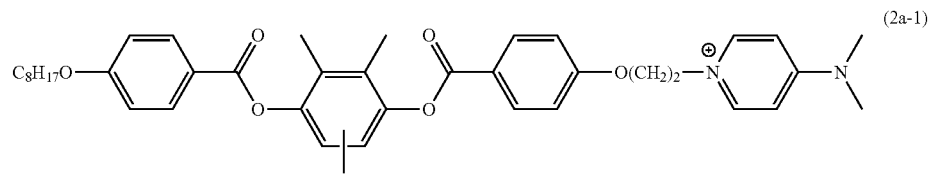

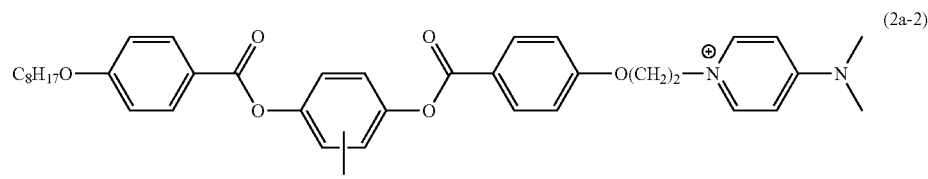

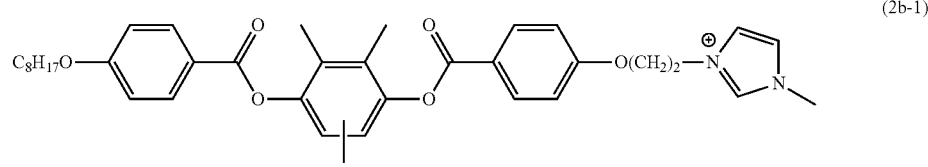

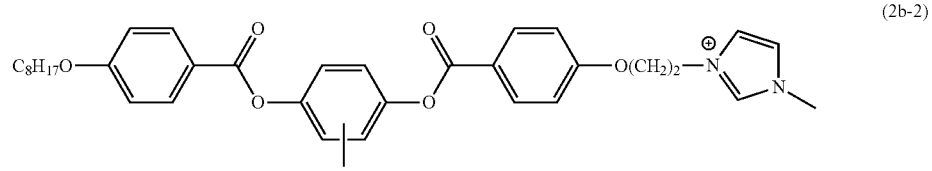

The compounds represented by Formulae (2a) and (2b) can be manufactured using a general method. For example, in general, a pyridinium derivative represented by Formula (2a) is obtained by alkylation (Menschutkin reaction) of a pyridine ring.

In the onium salts represented by Formulae (2a) and (2b), a pyridinium group or an imidazolium group is hydrophilic, and thus is eccentrically present in the aligned film interface of the hydrophilic polyvinyl alcohol. In particular, in a case where the pyridinium group of the onium salt is further substituted with an amino group as a substituent of a hydrogen atom acceptor (in Formulae (2a) and (2a-I), $R^{22}$ represents an unsubstituted amino group or a substituted amino group having 1 to 20 carbon atoms), an intermolecular hydrogen bond is formed between the onium salt and the polyvinyl alcohol, and the onium salt as a pyridinium derivative is eccentrically present in the aligned film interface with higher concentration. Further, due to the effect of the hydrogen bond, the pyridinium derivative is aligned in a direction perpendicular to the main chain of the polyvinyl alcohol, and thus promotes the alignment of the liquid crystal compound perpendicular to the rubbing direction. The pyridinium derivative has a plurality of aromatic rings in a molecule. Therefore, a strong intermolecular π-π interaction occurs between the pyridinium derivative and the liquid crystal compound, in particular, the disk-shaped liquid crystal compound, and induces perpendicular alignment in the vicinity of the aligned film interface of the disk-shaped liquid crystal compound. In particular, in a case where a hydrophobic aromatic ring is linked to a hydrophilic pyridinium group as shown in Formula (2a-I), an effect of inducing homeotropic alignment is obtained due to the hydrophobic effect.

In a case where the onium salt represented by Formula (2a) and the onium salt represented by Formula (2b) are used in combination, anions are exchanged with ions of an acidic compound that is produced from a photoacid generator by photodegradation, and the hydrogen bonding strength and the hydrophilicity of the onium salt change. As a result, the eccentricity in the aligned film interface deteriorates, and parallel alignment of the liquid crystal compound is promoted. The reason for this is that, due to the salt exchange, the onium salt is uniformly dispersed in the aligned film, the concentration thereof in the aligned film interface decreases, and the liquid crystal compound is aligned due to a restricting force of the rubbing aligned film. Parallel alignment of the liquid crystal compound refers to a state where the slow axis of the liquid crystal compound is aligned parallel to a rubbing direction.

Hereinafter, preferable examples of the onium salt (aligned film-side alignment assistant) will be described. Each of two compounds represented by the following structural formulae is a mixture (mixing mass ratio=50:50) of two compounds that are different from each other in a substitution site of a methyl group in a trimethyl-substituted benzene ring.

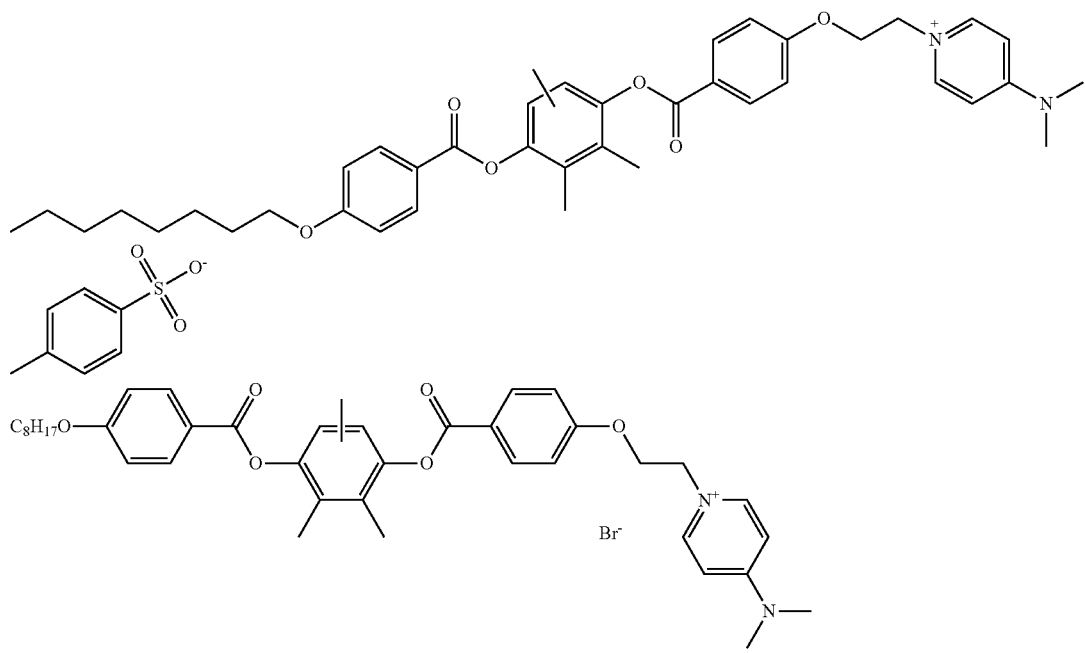

The content of the onium salt in the liquid crystal layer or the liquid crystal composition is preferably 5 mass % or lower and more preferably 0.1 to 2 mass % with respect to the content of the liquid crystal compound.

——Compound including Boron——

It is preferable that the liquid crystal layer includes a compound including boron from the viewpoint of vertically aligning the smectic liquid crystal compound and reducing the addition amount. Examples of the compound including boron include compounds described in paragraphs "0064" to "0079" of JP2014-191156A, the content of which is incorporated herein by reference.

Hereinafter, preferable examples of the compound including boron will be shown, but the present invention is not limited thereto. Each of compounds represented by the following structural formulae is a mixture (mixing mass ratio=50:50) of two compounds that are different from each other in a substitution site of a methyl group in a trimethyl-substituted benzene ring.

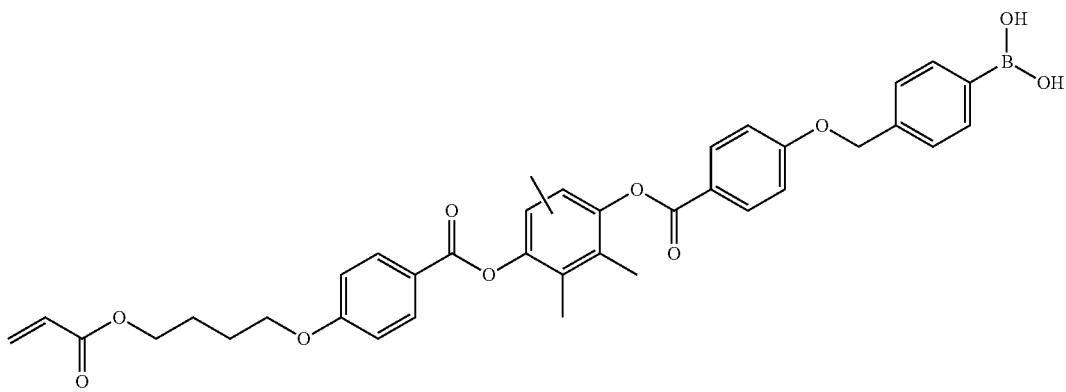

The content of the compound including boron in the liquid crystal layer or the liquid crystal composition is preferably 0.1 mass % to 10 mass % and more preferably 0.3 mass % to 1 mass % with respect to the content of the liquid crystal compound.

———Fluoroaliphatic Group-Containing Copolymer (Air Interface Alignment Assistant)———

A fluoroaliphatic group-containing copolymer is used to control alignment in an air interface of the liquid crystal compound, and acts to increase a tilt angle in the vicinity of the air interface of molecules of the liquid crystal compound. Further, by using the fluoroaliphatic group-containing copolymer, coating properties such as unevenness or cissing are improved.

As the fluoroaliphatic group-containing copolymer, one selected from compounds described in JP2004-333852A, JP2004-333861A, JP2005-134884A, JP2005-179636A, and JP2005-181977A can be used. In particular, a polymer including a fluoroaliphatic group and one or more hydrophilic groups at a side chain described in JP2005-179636A and JP2005-181977A is preferable, the hydrophilic groups selected from the group consisting of a carboxyl group (—COOH), a sulfo group (—SO$_3$H), a phosphonooxy {—OP(=O)(OH)$_2$}, and salts thereof.

The fluoroaliphatic group-containing copolymer improves the eccentricity in the air interface due to the hydrophobic effect of the fluoroaliphatic group, provides a low surface energy field to the air interface side, and can increase a tilt angle of liquid crystals, in particular, the disk-shaped liquid crystal compound. Further, in a case where the fluoroaliphatic group-containing copolymer includes a copolymerization component including one or more hydrophilic groups selected from the group consisting of a carboxyl group (—COOH), a sulfo group (—SO$_3$H), a phosphonooxy {—OP(=O)(OH)$_2$}, and salts thereof at a side chain, homeotropic alignment of the liquid crystal compound can be realized due to charge repulsion between anions of the fluoroaliphatic group-containing copolymer and π-electrons of the liquid crystal compound.

As the fluoroaliphatic group-containing copolymer, a well-known fluorine surfactant may be used instead of the fluoroaliphatic group-containing copolymer.

The content of the fluoroaliphatic group-containing copolymer in the liquid crystal layer or the liquid crystal composition is preferably 0 mass % to 10 mass %, more preferably 0 mass % to 1 mass %, and still more preferably 0 mass % with respect to the content of the liquid crystal compound.

—Alignment Temperature Lowering Agent—

In the infrared control film according to the present invention, it is preferable that the liquid crystal layer includes an alignment temperature lowering agent from the viewpoint of widening a temperature range where the liquid crystal layer forms the smectic liquid crystal phase to a low temperature range side. In the infrared control film according to the present invention, it is preferable that the liquid crystal layer includes an alignment start temperature lowering agent from the viewpoint that the liquid crystal layer forms the smectic liquid crystal phase in a temperature range of −20° C. to 25° C.

The alignment start temperature lowering agent refers to a material that lowers the alignment start temperature of the liquid crystal layer to which the material is added. It is preferable that the alignment start temperature lowering agent is a material that lowers the alignment start temperature of the liquid crystal layer to which the material is added to −20° C. or lower.

It is preferable that the alignment start temperature lowering agent is a material that lowers Δn of the liquid crystal layer to which the material is added. An refers to refractive index anisotropy of an optically-anisotoropic layer.

The alignment start temperatures of the liquid crystal layer before and after the addition of the alignment start temperature lowering agent can be measured using a method of verifying a homeotropically aligned state or a homogeneously aligned state.

The homeotropically aligned state is verified as follows. A film including the liquid crystal layer is disposed on a temperature-variable Peltier element. The film is observed a polarizing microscope in a crossed Nicol state (Peltier element in which a hole is formed in only a measurement portion). Whether or not disclination occurs in a monodomain is determined based on the result of observing a positive uniaxial refractive index structure with a conoscope.

The homogeneously aligned state is verified as follows. A film including the liquid crystal layer is disposed on a temperature-variable Peltier element. The film is observed a polarizing microscope in a crossed Nicol state (Peltier element in which a hole is formed in only a measurement portion). In a case where a rubbing direction is matched to any one of upper and lower polarizers, an extinction position is provided. In other cases, transmission of light is observed.

The alignment temperature lowering agent is not particularly limited and is preferably compatible with liquid crystal molecules. Specific examples of the alignment temperature lowering agent include a (meth)acrylic polymer, an alkyl (meth)acrylate monomer, and an ionic compound. Among these, a (meth)acrylic polymer or an ionic compound is preferable.

In this specification, (meth)acryl represents either or both of methacryl and acryl, and the same shall be applied to (meth)acrylate.

A preferable aspect of the (meth)acrylic polymer, the alkyl (meth)acrylate monomer, and the ionic compound that can be used as the alignment temperature lowering agent will be described.

——(Meth)Acrylic Polymer——

Specific examples of the (meth)acrylic polymer include: an alkyl (meth)acrylate which has an alkyl group having 1 to 18 carbon atoms such as methyl (meth)acrylate, ethyl (meth)acrylate, n-propyl (meth)acrylate, isopropyl (meth) acrylate, n-butyl (meth)acrylate, isobutyl (meth)acrylate, 2-ethylhexyl (meth)acrylate, n-octyl (meth)acrylate, isooctyl (meth)acrylate, lauryl (meth)acrylate, stearyl (meth)acrylate, or cyclohexyl (meth)acrylate; an alkoxyalkyl (meth) acrylate that has an alkoxyalkyl group having 3 to 18 carbon atoms such as methoxyethyl (meth)acrylate, ethoxyethyl (meth)acrylate, or butoxyethyl (meth)acrylate; an alkoxyethylene glycol (meth)acrylate that has an alkoxyethylene glycol residue having 6 to 20 carbon atoms such as butoxydiethylene glycol (meth)acrylate or methoxytriethylene glycol (meth)acrylate; an aryloxyalkyl (meth)acrylate that has an aryloxyalkyl group having 7 to 20 carbon atoms such as phenoxyethyl (meth)acrylate; phenoxypolyethylene glycol (meth)acrylate; and an arylalkyl (meth)acrylate that has an arylalkyl group having 7 to 20 carbon atoms such as benzyl (meth)acrylate.

Among these, n-butyl acrylate or n-propyl (meth)acrylate is preferable from the viewpoint of obtaining an effect of lowering a glass transition temperature (Tg) and suppressing deterioration of alignment, and n-butyl acrylate is more preferable.

——Alkyl (Meth)Acrylate Monomer——

A preferable example of the alkyl (meth)acrylate monomer is an alkyl (meth)acrylate monomer represented by the following Formula (3).

$$H_2C=CHCOOR^2 \quad (3)$$

with $R^1$ above.

In Formula (3), $R^1$ represents a hydrogen atom or a methyl group. In addition, in Formula (3), $R^2$ represents a linear or branched alkyl group and preferably a linear or branched alkyl group which is not substituted with a crosslinking group such as an amino group or a carboxyl group. In addition, the number of carbon atoms in the alkyl group is 2 to 5 and preferably 2 to 4. In addition, the number of carbon atoms in the longest chain of the alkyl group is 2 and 3 and preferably 2.

Examples of $R^2$ in Formula (3) include an ethyl group (—$C_2H_5$), a propyl group (—$CH_2CH_2CH_3$), an isopropyl group (—$CH(CH_3)_2$), a 1-methylpropyl group (—$CH_2$(CH_3)CH_2CH_3$), a 2-methylpropyl group (—$CH_2CH$(CH_3)_2$), a tert-butyl group (—$C(CH_3)_3$), a 1-ethylpropyl group (—$CH(CH_2CH_3)_2$), a 1,1-dimethylpropyl group (—$C(CH_3)_2CH_2CH_3$), and a tert-pentyl group (—$CH_2C(CH_3)_3$).

——Specific Examples of Ionic Compound——

As the ionic compound, for example, an ionic compound that is formed of an anion and a cation and is liquid or solid at 25° C. can be used, and specific examples thereof include an alkali metal salt, an ionic liquid (liquid at 25° C.), and a well-known surfactant. Preferable aspects of the alkali metal salt and the ionic liquid (liquid at 25° C.) will be described.

As the alkali metal salt, for example, a compound that is formed of an alkali metal cation such as lithium, sodium, or potassium and an anion, and specific examples thereof include sodium chloride, potassium chloride, lithium chloride, lithium perchlorate, potassium chlorate, potassium nitrate, sodium nitrate, sodium carbonate, sodium thiocyanate, LiBr, LiI, LiBF$_4$, LiPF$_6$, LiSCN, sodium acetate, sodium alginate, sodium lignin sulfonate, sodium toluene sulfonate, LiCF$_3$SO$_3$, Li(CF$_3$SO$_2$)$_2$N, Li(CF$_3$SO$_2$)IN, Li(C$_2$F$_5$SO$_2$)$_2$N, Li(C$_2$F$_5$SO$_2$)IN, and Li(CF$_3$SO$_2$)$_3$C.

Examples of the cation constituting the ionic liquid include a piperidinium cation, a pyrrolidinium cation, a cation having a pyrroline skeleton, a cation having a pyrrole skeleton, an imidazolium cation, a tetrahydropyridinium cation, a dihydropyridinium cation, a pyrazolium cation, a pyrazolinium cation, a tetraalkylammonium cation, a trialkylsulfonium cation, and a tetraalkylphosphonium cation.

Examples of the anion constituting the ionic liquid include Cl$^-$, Br$^-$, I$^-$, AlCl$_4^-$, Al$_2$Cl$_7^-$, BF$_4^-$, PF$_6^-$, ClO$_4^-$, NO$_3^-$, CH$_3$COO$^-$, CF$_3$COO$^-$, CH$_3$SO$_3^-$, CF$_3$SO$_3^-$, (CF$_3$SO$_2$)$_2$N$^-$, (CF$_3$SO$_2$)$_3$C$^-$, AsF$_6^-$, SbF$_6^-$, NbF$_6^-$, TaF$_6^-$, F(HF)$_n^-$ (n=2 and 3), (CN)$_2$N$^-$, C$_4$F$_9$SO$_3^-$, (C$_2$F$_5$SO$_2$)$_2$N$^-$, C$_3$F$_7$COO$^-$, and (CF$_3$SO$_2$)(CF$_3$CO)N$^-$.

Examples of the ionic compound include an ionic compound that is formed of the cation and the anion and is liquid at 25° C. Specific examples of the ionic compound include 2-methyl-1-pyrroline tetrafluoroborate, 1-ethyl-2-phenylindoletetrafluoroborate, 1,2-dimethylindoletetrafluoroborate, 1-ethylcarbazoletetrafluoroborate, 1-ethyl-3-methylimidazoliumtetrafluoroborate, 1-ethyl-3-methylimidazoliumacetate, 1-ethyl-3-methylimidazoliumtrifluoroacetate, 1-ethyl-3-methylimidazoliumheptafluorobutyrate, 1-ethyl-3-methylimidazoliumtrifluoromethanesulfonate, 1-ethyl-3-methylimidazoliumperfluorobutanesulfonate, 1-ethyl-3-methylimidazoliumdicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-methylpyrazolium tetrafluoroborate, 3-methylpyrazolium tetrafluoroborate, tetrahexylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2- methoxyethyl)ammonium bis(trifluoromethanesulfonyl)imide, N,N-diethyl-N-methyl-N-(2-methoxyethyl)ammonium bis(pentafluoroethanesulfonyl)imide, glycidyltrimethylammonium trifluoromethanesulfonate, glycidyltrimethylammonium bis(trifluoromethanesulfonyl)imide, glycidyltrimethylammonium bis(pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, N,N-diethyl-N-methyl-N-(2-methoxyethyl)ammonium (trifluoromethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, tri,octylmethylammonium bis(trifluoromethanesulfonyl)imide, and N-methyl-N-ethyl-N-propyl-N-pentylammonium bis(trifluoromethanesulfonyl)imide.

Among these, 1-butyl-3-methylimidazolium hexafluorophosphate or 1-ethyl-3-methylimidazoliumtetrafluoroborate is preferable from the viewpoint of suppressing deterioration of alignment, and 1-butyl-3-methylimidazolium hexafluorophosphate is more preferable.

The content of the alignment temperature lowering agent in the liquid crystal layer or the liquid crystal composition is preferably 0.1 to 10 mass %, more preferably 0.5 mass % to 5 mass %, and still more preferably 0.5 mass % to 3 mass % with respect to the content of the liquid crystal compound.

—Polymerization Initiator—

Examples of the polymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), an oxadiazole compound (described in U.S. Pat. No. 4,212,970A), and an acylphosphine oxide compound (described in JP1988-40799B (JP-S63-40799B), JP1993-29234B (JP-H5-29234B), JP1998-95788A (JP-H10-95788A), and JP1998-29997A (JP-H10-29997A)).

In an aspect where a polymerization reaction progresses with ultraviolet irradiation, it is preferable that the polymerization initiator is a photopolymerization initiator which initiates a polymerization reaction with ultraviolet irradiation.

In the infrared control film according to the present invention, the liquid crystal layer or the liquid crystal composition for forming the liquid crystal layer may not include the polymerization initiator. The content of the photopolymerization initiator in the liquid crystal composition is preferably 0 to 20 mass %, more preferably 0 to 12 mass %, and still more preferably 0 to 10 mass % with respect to the content of the polymerizable liquid crystal compound.

—Solvent—

As a solvent of the liquid crystal composition, an organic solvent is preferably used. Examples of the organic solvent include amides (for example, N,N-dimethylformamide), sulfoxides (for example, dimethyl sulfoxide), heterocyclic compounds (for example, pyridine), hydrocarbons (for example, benzene, or hexane), alkyl halides (for example, chloroform or chloromethane), esters (for example, methyl acetate, or butyl acetate), ketones (for example, acetone, methyl ethyl ketone, cyclohexanone, or cyclopentanone), and ethers (for example, tetrahydrofuran or 1,2-dimethoxyethane). Among these, alkyl halide or ketone is preferable, and methyl ethyl ketone is more preferable. Two or more organic solvents may be used in combination.

<Aligned Film>

It is preferable that the infrared control film according to the present invention further includes an aligned film that is in direct contact with the liquid crystal layer.

For example, the infrared control film according to the present invention may further include an aligned film adjacent to the liquid crystal layer or an aligned film adjacent to the liquid crystal layer. This aligned film has a function of controlling alignment of liquid crystal molecules during the formation of the liquid crystal layer.

The aligned film can be provided, for example, for a rubbing treatment of an organic compound (preferably a polymer), oblique angle deposition of an inorganic compound such as SiO, or formation of a layer having microgrooves. Further, an aligned film (preferably, a photo-alignment film) to which an alignment function is imparted by application of an electric field, application of a magnetic field, or light irradiation is also known.

Depending on a material of a lower layer below the liquid crystal layer, the lower layer can function as the aligned film by performing an alignment treatment (for example, a rubbing treatment) directly on the lower layer even without providing the aligned film. Examples of a support as the lower layer include polyethylene terephthalate (PET; hereinafter, the same shall be applied).

In addition, there may be a case where, by making the lower layer function as the aligned film, the liquid crystal layer as the upper layer or the liquid crystal compound for forming the liquid crystal layer can be aligned. In this case, the liquid crystal compound as the upper layer can be aligned without providing the aligned film or without performing a special alignment treatment (for example, a rubbing treatment).

As an example of the aligned film, a method of using a photo-alignment film is preferable. The photo-alignment film is less likely to be discolored, and the thickness thereof can be easily reduced. Therefore, the photo-alignment film is preferable from the viewpoint of suppressing yellow tinting of the infrared control film and improving the front-direction tint and the oblique-direction tint.

In the infrared control film according to the present invention, it is preferable that the aligned film is a photo-alignment film from the above-described viewpoint and the viewpoints of increasing the phase transition speed between the smectic liquid crystal phase and the cholesteric liquid crystal phase and increasing the speed at which the infrared light transmittance changes depending on the temperature.

In addition, preferable aspects of the rubbing aligned film and the photo-alignment film that are used after rubbing the surface will be described.

(Rubbing Aligned Film)

Examples of a polymer that can be used for the rubbing aligned film include polymers described in paragraph "0022" of JP1996-338913A (JP-H8-338913A), for example, a methacrylate copolymer, a styrene copolymer, polyolefin, polyvinyl alcohol, modified polyvinyl alcohol, poly(N-methylolacrylamide), polyester, polyimide, a vinyl acetate copolymer, carboxymethyl cellulose, and polycarbonate. A silane coupling agent can also be used as the polymer. From the viewpoint of absorbing a larger amount of blue light than a polyimide aligned film to reduce tendency of being discolored yellow and suppressing yellow tinting of the infrared control film, a water-soluble polymer (for example, poly(N-methylolacrylamide), carboxymethyl cellulose, gelatin, polyvinyl alcohol, or modified polyvinyl alcohol) is preferable, gelatin, polyvinyl alcohol, or modified polyvinyl alcohol is more preferable, and polyvinyl alcohol or modified polyvinyl alcohol is most preferable.

The above-described composition is applied to a rubbed surface of the aligned film to align molecules of the liquid crystal compound. Next, optionally, the polymer of the aligned film and a polyfunctional monomer included in an optically-anisotoropic layer are caused to react with each other, or the polymer of the aligned film is crosslinked using a crosslinking agent such that the above-described optically-anisotoropic layer can be formed.

The surface of the aligned film to which the liquid crystal composition is applied is optionally rubbed. The rubbing treatment can be performed by rubbing a surface of a film including a polymer as a major component with paper or fabric in a given direction. A general method of the rubbing treatment is described in, for example, "Liquid Crystal Handbook (Maruzen Publishing Co., Ltd., Oct. 30, 2000).

As a method of changing the rubbing density, a method described in "Liquid Crystal Handbook (Maruzen Publishing Co., Ltd.") can be used. The rubbing density (L) can be determined according to the following Expression (A).

$$L=Nl(1+2\pi rn/60v)$$ Expression (A)

In Expression (A), N represents the number of times of rubbing, l represents the contact length of a rubbing roller, r represents the radius of a roller, n represents the rotation speed (revolutions per minute: rpm) of the roller, and v represents a stage moving speed (speed per second).

In order to increase the rubbing density, a method of increasing the number of times of rubbing, increasing the contact length of the rubbing roller, increasing the radius of the roller, increasing the rotation speed of the roller, or delaying the stage moving speed may be adopted. On the other hand, in order to decrease the rubbing density, the method may be reversed. In addition, conditions for the rubbing treatment can be found in JP4052558B.

(Photo-Alignment Film)

As a photo-alignment film material used for the photo-alignment film that is formed by light irradiation, materials described in a large number of documents can be used. Preferable examples of the photo-alignment film material include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignment unit described in JP2002-265541A and JP2002-317013A; a photocrosslinking silane derivative described in JP4205195B and JP4205198B, a photocrosslinking polyimide, polyamide, or ester described in JP2003-520878A, JP2004-529220A, paragraphs "0024" to "0043" of WO2005/096041A, and JP4162850B; and a photodimerizable compound, in particular, a cinnamate (cinnamic acid) compound, a chalcone compound, or a phosphorus compound described in JP1997-118717A (JP-H9-118717A), JP1998-506420A (JP-H10-506420A), JP2003-505561A, WO2010/150748A, paragraphs "0028" to "0176" of JP2012-155308A, JP2013-177561A, and JP2014-12823A. Among these, an azo compound, a photocrosslinking polyimide, polyamide, ester, a cinnamate compound, or a chalcone compound is more preferable.

Specific examples of the more preferable photo-alignment film material include a compound represented by Formula (1) in JP2006-285197A and a liquid crystal aligning agent having a photo-alignable group described in paragraphs "0028" to "0176" of JP2012-155308A. As the photo-alignment film, for example, LPP-JP265CP (trade name, manufactured by Rolic Technologies Ltd.) can be used.

By irradiating a film formed of the material with linearly polarized light or non-polarized light, the photo-alignment film can be manufactured.

In this specification, "irradiation of linearly polarized light" refers to an operation for causing a photoreaction to occur in the photo-alignment film material. The wavelength of light to be used varies depending on the photo-alignment film material to be used and is not particularly limited as long as it is a wavelength required for the photoreaction. As the light used for the light irradiation, light having a peak wavelength of 200 nm to 700 nm is preferable, and ultraviolet light having a peak wavelength of 400 nm is more preferable.

Examples of a light source used for light irradiation include a typically used light source, for example, a lamp such as a tungsten lamp, a halogen lamp, a xenon lamp, a xenon flash lamp, a mercury lamp, a mercury xenon lamp, or a carbon arc lamp, various kinds lasers (for example, a semiconductor laser, a helium neon laser, an argon ion laser, a helium cadmium laser, or an yttrium aluminum garnet (YAG) laser), a light emitting diode, and a cathode-ray tube.

As means for obtaining linearly polarized light, for example, a method of using a polarizer (for example, an iodine polarizer, a two-color polarizer, a wire grid polarizer), a method of using a prism element (for example, a Glan-Thompson prism) or a reflective polarizer using a Brewster's angle, or a method of using light emitted from a laser light source having polarization can be adopted. In addition, only light having a required wavelength may be selectively irradiated using, for example, a filter or a wavelength conversion element.

In a case where the light to be irradiated is linearly polarized light, a method of irradiating the aligned film with light in a direction perpendicular or oblique to the aligned film interface from an upper surface or a back surface can be adopted. The incidence angle of the light varies depending on the photo-alignment film material and, for example, is 0° to 90° (vertical) and preferably 40° to 90°.

In a case where non-polarized light is used, the non-polarized light is obliquely irradiated. The incidence angle of the non-polarized light is, for example, 10° to 80°, preferably 20° to 60°, and more preferably 30° to 50°.

The irradiation time is preferably 1 to 60 minutes and more preferably 1 to 10 minutes.

In addition, by selecting the material of the aligned film, the aligned film or only the liquid crystal layer can be peeled off from a temporary support for forming the liquid crystal layer. In addition, by adhering the transferred liquid crystal layer, that is, the peeled liquid crystal layer, a liquid crystal layer having a small thickness of several micrometers can be provided. Further, an aspect of directly laminating the rubbing aligned film or the photo-alignment film on the substrate and performing a rubbing treatment or a photo-alignment treatment to impart an alignment function is also preferable. That is, the infrared control film according to the present invention may be an infrared control film including the photo-alignment film or the rubbing aligned film on the surface of the substrate.

In the photo-alignment film used in the present invention, an aspect of imparting an alignment restriction force through a step of irradiating the photo-alignment film with polarized light from the perpendicular direction or the oblique direction or a step of irradiating the photo-alignment film with non-polarized light from the oblique direction is preferable. In a case where light is irradiated from the oblique direction, an angle between the oblique direction and the photo-alignment film is preferably 5 degrees to 45 degrees and more preferably 10 degrees to 30 degrees. Ultraviolet light may be irradiated with an irradiation intensity of preferably 200 to 2000 mJ/cm$^2$.

(Thickness of Aligned Film)

In the infrared control film according to the present invention, the thickness of the aligned film is preferably 3.0 μm or less, more preferably 0.1 to 1.0 μm, and still more preferably 0.2 to 0.8 μm. In a case where the thickness of the aligned film is small, tinting caused by the aligned film can be suppressed, and the front-direction tint and the oblique-direction tint of the infrared control film can be improved.

<Method of Manufacturing Infrared Control Film>

A method of manufacturing the infrared control film is not particularly limited.

(Method of Manufacturing Liquid Crystal Layer)

Hereinafter, a method of manufacturing the liquid crystal layer that can be used in the present invention will be used in detail.

A method of disposing the liquid crystal layer between the two substrates is not particularly limited.

As a method of forming the liquid crystal layer, a method of applying a coating solution for forming the liquid crystal layer to a predetermined member is preferable. The coating solution for forming the liquid crystal layer is preferably the liquid crystal composition.

In the method of forming the liquid crystal layer, it is preferable one composition, which is prepared as a coating solution includes the liquid crystal compound as a major component, is applied to the surface of the lower layer such as the substrate or the aligned film. The application of the liquid crystal composition can be performed by dissolving the liquid crystal composition in a solvent to obtain a solution or heating the liquid crystal composition to obtain a liquid such as a melt and spreading the solution or the liquid using an appropriate method such as a roll coating method, a gravure printing method, or a spin coating method. Further, the application of the liquid crystal composition can be performed using various methods such as a wire bar coating method, an extrusion coating method, a direct gravure coating method, a reverse gravure coating method, or a die coating method. In addition, a coating film can be formed by jetting the liquid crystal composition from a nozzle using an ink jet device.

After the application of the liquid crystal composition, the coating film may be dried using a well-known method. For example, the coating film may be dried by leaving it to stand or by heating.

It is preferable that the liquid crystal composition is optionally dried or heated after the application. It is preferable that the liquid crystal compound in the liquid crystal composition is aligned in the drying or heating step. In the case of heating, the heating temperature is preferably 200° C. or lower and more preferably 130° C. or lower.

It is preferable that, in the step of applying and drying the liquid crystal composition, the liquid crystal compound molecules in the liquid crystal composition are aligned to form a desired liquid crystal phase (the smectic liquid crystal phase or the cholesteric liquid crystal phase).

Optical characteristics based on the alignment of the liquid crystal compound molecules in the liquid crystal composition are sufficient as long as the liquid crystal composition is held in the liquid crystal layer, but it is preferable that the liquid crystal composition of the liquid crystal layer exhibits liquid crystal properties.

It is preferable that the liquid crystal layer is formed without being polymerized or cured in the aligned state. As the liquid crystal compound, a liquid crystal compound having a polymerizable group may be used. For example, a method of polymerizing the liquid crystal compound such that the liquid crystal phase is not completely fixed is preferable. As this method, for example, a method of using a liquid crystal compound not having a polymerizable group as the liquid crystal compound, or a method of using a liquid crystal compound having a polymerizable group without adding a polymerization initiator to the liquid crystal phase is preferably used.

Here, as an aspect of the state where the liquid crystal phase is "fixed", a state where the alignment of the liquid crystal compound is held is the most typical. However, the state where the liquid crystal phase is "fixed" is not limited to this aspect. Specifically, the state where the liquid crystal phase is "fixed" refers to a state where the fixed aligned state can be stably maintained without being fluid and being changed by an external field or an external force in a temperature range of typically 0° C. to 50° C., more strictly, −30° C. to 70° C.

As the method of forming the liquid crystal layer, for example, a method of sealing the liquid crystal composition including the liquid crystal compound and the like between the two substrates is preferable.

A method of sealing the liquid crystal composition between the two substrates is not particularly limited.

For example, a method of forming the liquid crystal layer on a first substrate, providing a sealing material on a second substrate so as to surround the periphery of the liquid crystal layer of the first substrate, disposing the first substrate on which the liquid crystal layer is formed and the second substrate to overlap each other, and fixing the sealing material can be used.

The sealing material is not particularly limited. For example, a photocurable resin such as a well-known epoxy resin can be used.

In a case where the first substrate on which the liquid crystal layer is formed and the second substrate are disposed to overlap each other, as a method of controlling the sealing material so as to surround the periphery of the liquid crystal layer of the first substrate, for example, a method of adjusting the transport speed and the adhering timing can be used.

A method of fixing the sealing material is not particularly limited. For example, in a case where the sealing material is a photocurable resin, a method of irradiating an active energy ray in a state where the first substrate on which the liquid crystal layer is formed and the second substrate overlap each other can be used.

In addition, as a method of sealing the liquid crystal layer or the liquid crystal composition between the two substrates other than the method of sealing the end portion of the liquid crystal layer using a photocurable resin such as an epoxy resin, a method such as thermal compression bonding may be used.

As the method such as thermal compression bonding, a method described in paragraphs "0088" to "0095" of JP2010-45337A or a method described in paragraphs "0056" and "0057" of JP1997-29882A (JP-H9-29882A) can be used, the contents of which are incorporated herein by reference.

Specifically, a method of providing a sealing material capable of thermal compression bonding on the second substrate so as to surround the periphery of the liquid crystal layer of the first substrate, disposing the first substrate on which the liquid crystal layer is formed and the second substrate to overlap each other, and causing this laminate to pass through a pair of heating rolls having a roll temperature set to a predetermined temperature to apply heat and pressure thereto can be adopted. Alternatively, a method of applying heat and pressure using a press machine set to a predetermined temperature can be adopted.

As the method of applying heat and pressure, the above-described thermal lamination method can be preferably used. The reason for this is that there are advantageous effects in that a roll-to-roll process or the like that can contribute to improvement of productivity due to continuous production can be performed and a shape such as a tape shape or an elongated shape can be easily obtained. The heating temperature, the pressing pressure, and the like can be selected to be in the most appropriate ranges according to the materials of the liquid crystal layer, the sealing material, the substrate, and the like.

Thermal compression bonding means is not particularly limited. For example, a well-known heating roller or an impulse sealer can be used.

The width of a portion where the sealing material is formed is not particularly limited, and an optimum width can be selected so as not to interfere with cutting.

(Method of Cutting Infrared Control Film)

A method of cutting the infrared control film is not particularly limited. In a case where the liquid crystal layer is sealed between the two substrates in a state where it has fluidity, for example, the infrared control film can be cut, for example, using a cutting method described in paragraphs "0088" to "0095" of JP2010-45337A.

An example of the cutting method is a step of cutting the infrared control film along a portion where the sealing material is formed, the portion being formed in the above-described sealing step. Through this cutting step, the infrared control film including the liquid crystal layer in which a cut end surface is sealed after cutting can be obtained.

That is, the liquid crystal layer obtained after cutting also has a structure where the periphery of the liquid crystal layer is sealed with the sealing material.

Cutting means during the cutting is not particularly limited, and various kinds of cutting means having a blade portion such as scissors or a cutter can be adopted.

In this cutting method, the infrared control film obtained through the cutting method may be further cut along another portion.

<Use of Infrared Control Film>

The infrared control film according to the present invention can be used for various uses where light control properties or light shielding properties are required. Specifically, for example, the infrared control film according to the present invention can be preferably used in various fields including: the field of imaging, for example, cameras, video tape recorders (VTR), imaging lenses for projectors, finders, filters, prisms, or Fresnel lenses; the field of lenses, for example, pick-up lenses for optical discs in compact disc (CD) players, digital versatile disc (DVD) players, mini disc (MD) players, or the like; the field of optical recording for optical discs, for example, CD plays, DVD players, or MD players; the field of information devices, for example, films for liquid crystal displays such as liquid crystal light guide plates, polarizing plate protective films, or phase difference films, or surface protective films; the field of optional communication, for example, optical fibers, optical switches, or optical connectors; the field of vehicles, for example, automobile headlights, tail lamp lenses, inner lenses, instrument covers, or sunroofs; the field of medical instruments, for example, eyeglasses, contact lenses, lenses for endoscopes, or medical supplies requiring sterilization; the field of architecture and building materials, for example, light-transmitting plates for roads, lenses for double-glazed glass, lighting windows, carports, lenses for lighting, lighting covers, partition walls for rooms, or siding boards for building materials; and microwave oven cooking vessels (table wares). In addition, the infrared control film according to the present invention can be used in various kinds of windows for buildings, for example, residential buildings such as detached houses or apartment buildings or commercial buildings such as office buildings. In addition, the infrared control film according to the present invention can be used in windows for vehicles such as automobiles. Further, the infrared control film according to the present invention can be used in the field of daily necessities, for example, picture frames or planner covers.

Among these, the infrared control film according to the present invention can be preferably used for uses such as windows, partition walls for rooms, picture frames, planner covers, or carports, and can be more preferably used for windows.

[Roll]

A roll according to the present invention is obtained by winding the infrared control film according to the present invention in a roll shape. In a case where the substrate of the infrared control film according to the present invention is a film, the roll can be easily formed.

[Window]

A window according to the present invention includes the infrared control film according to the present invention.

The infrared control film according to the present invention may be used as a window without any change, or may be used in combination with another well-known member such as a light-transmitting substrate such as glass or a window frame. The window according to the present invention can be appropriately changed using a well-known method so as to be used in the aspects described in the uses of the infrared control film according to the present invention.

In a case where the infrared control film according to the present invention is attached to an existing window, the infrared control film can be adhered to the window through a given adhesive or adhesive material. In a case where the substrate of the infrared control film according to the present invention is a film, the infrared control film can be easily provided in a curved member (for example, a windshield of a vehicle).

<Configuration>

Figure 2:
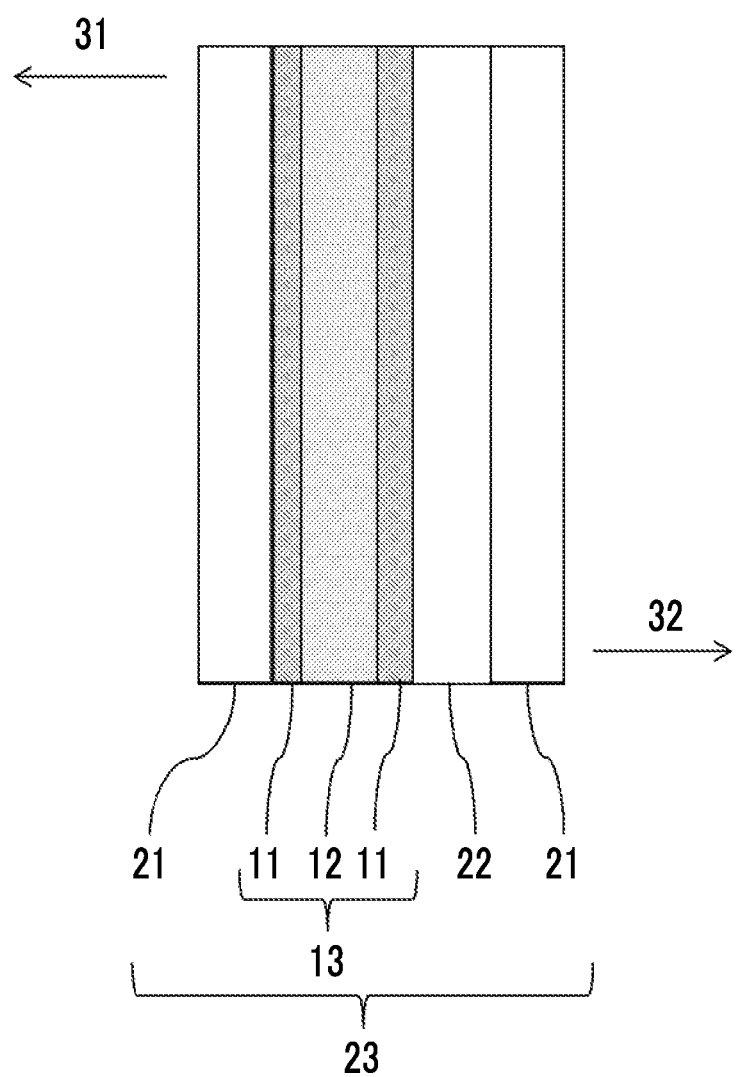
FIG. 2 is a schematic diagram showing a cross-section of an example of a window according to the present invention.

A configuration of the window according to the present invention will be described with reference to the drawings. FIG. 2 is a schematic diagram showing a cross-section of an example of the window according to the present invention. A window 23 shown in FIG. 2 includes the infrared control film 13 according to the present invention. In the window 23 shown in FIG. 2, two glasses 21 are laminated with a heat insulating layer 22 such as an air layer interposed therebetween.

EXAMPLES

Hereinafter, the present invention will be described in detail using Examples and Comparative Examples. Materials, used amounts, ratios, treatment details, treatment procedures, and the like shown in the following examples can be appropriately changed within a range not departing from the scope of the present invention. Accordingly, the scope of the present invention is not limited to the following specific examples.

[Materials Used]

Materials used in the following Examples and Comparative Examples are as follows.

<Substrate>

A triacetyl cellulose (TAC; hereinafter, the same shall be applied) substrate was prepared using the following method.

[Preparation of Core Layer Cellulose Acylate Solution]

The following composition was put into a mixing tank, and the respective components were stirred and dissolved to prepare a cellulose acetate solution.

Composition of Core Layer Cellulose Acylate Solution

Cellulose acetate having an acetyl substitution degree of 2.88: 100 parts by mass Ester oligomer (the following plasticizer 1): 10 parts by mass Polarizer durability improving agent (the following compound A): 4 parts by mass Ultraviolet absorber: the kind and amount shown in Tables 4 and 6

Colorant: the kind and amount shown in Tables 4 and 6

Solvent 1 (methylene chloride): 438 parts by mass

Solvent 2 (methanol): 65 parts by mass

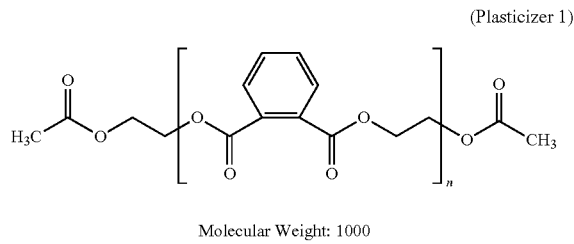

(Plasticizer 1)

Molecular Weight: 1000

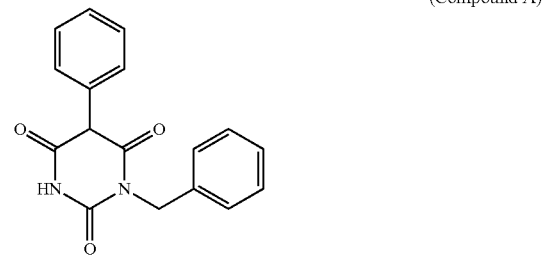

(Compound A)

[Preparation of Outer Layer Cellulose Acylate Solution]

10 parts by mass of a matting agent solution described in paragraph "0307" of JP2014-206725A was added to 90 parts by mass of the core layer cellulose acylate solution to prepare an outer layer cellulose acylate solution.

[Preparation of Cellulose Acylate Film]

The core layer cellulose acylate solution and the outer layer cellulose acylate solution were simultaneously cast on a drum at 20° C. from casting nozzles such that the outer layer cellulose acylate solutions are disposed on opposite sides of the core layer cellulose acylate solution. The obtained film was removed in a state where the solvent content was about 20 mass %, opposite ends of the film in the width direction were fixed using a tenter clip, and the film was horizontally stretched to 1.1 times and dried in a state where the residual solvent content was 3 to 15 mass %. Next, by transporting the film between rolls of a heat treatment device, a TAC substrate having a thickness of 25 µm was prepared.

Using a pellet for preparing an acrylic substrate having the following composition, an acrylic substrate was prepared according to the following method.

(Composition for Preparing Acrylic Substrate)

Acrylic resin (DIANAL BR88, manufactured by Mitsubishi Rayon Co., Ltd.): 100 parts by mass Ultraviolet absorber (UV509): the amount shown in Tables 4 and 6

Colorant: the amount shown in Tables 4 and 6

Solvent 1 (methylene chloride): 393 parts by mass

Solvent 2 (methanol): 59 parts by mass

Using a pellet of a composition for preparing an acrylic substrate, an acrylic substrate was formed using the following method.

The pellet of a composition for preparing an acrylic substrate was put into a single screw extruder having an extrusion diameter of 65 mm, and a polycarbonate resin "CALIBRE 301-10" (manufactured by Sumika Polycarbonate Ltd.) was put into a single screw extruder having an extrusion diameter of 45 mm. The components were integrated by being melted and laminated using a multi-manifold process, and was extruded through a T-shaped die having a preset temperature of 260° C. The obtained film-shaped material is interposed between a pair of metal rolls and molded. As a result, an acrylic substrate having a thickness (total thickness) of 120 μm and having a three-layer configuration of an acrylic resin layer/a polycarbonate resin layer/an acrylic resin layer was prepared.

—Preparation of Substrate with Interlayer—

A corona discharge treatment was performed on a single surface of the substrate in a treatment amount of 500 J/m². Next, using a reverse roll method, a composition E-1 for forming an interlayer having the composition was applied to the surface on which the corona discharge treatment was performed such that the thickness after drying was adjusted to be 0.30 m. As a result, a substrate with an interlayer was prepared. The substrate with the interlayer was used as the acrylic substrate.

Composition of Composition E-1 for Forming Interlayer

| | |
|---|---|
| PVA (1): | 57.60 parts by mass |
| Acrylic resin: | 28.80 parts by mass |
| Crosslinking agent: isocyanate compound A | 4.00 parts by mass |
| Crosslinking catalyst: organic tin compound | 0.70 parts by mass |
| Particles: silica | 8.10 parts by mass |
| Surfactant: | 0.80 parts by mass |
| Solvent: water | 100 parts by mass |
| Solid content ratio: | 8.90 mass % |

PVA (1): a carboxylic acid-modified polyvinyl alcohol resin (manufactured by Kuraray Co., Ltd.) having a saponification degree of 77% and a polymerization degree of 600

Acrylic resin: an acrylic resin obtained by polymerization of a monomer having the following composition.

An emulsion polymer (emulsifier: anionic surfactant) of methyl methacrylate/styrene/2-ethyl hexyl acrylate/2-hydroxyethyl methacrylate/acrylic acid=59/9/26/5/1 (mass ratio)

Crosslinking agent (isocyanate compound A): an isocyanate compound prepared according to the following procedure The internal atmosphere of a four-neck flask to which a stirrer, a thermometer, a reflux cooling pipe, and a nitrogen blowing pipe were attached was set as a nitrogen atmosphere, 1000 parts by mass of hexamethylene diisocyanate (HDI) and 22 parts by mass of trimethylolpropane (molecular weight: 134) as a trihydric alcohol were put into the four-neck flask, and the internal temperature of the reactor was kept at 90° C. for 1 hour under stirring to form a urethane. Next, the temperature of the reaction solution was kept at 60° C., and an isocyanurate catalyst trimethyl benzyl ammonium hydroxide was added. Once the conversion ratio reached 48%, phosphoric acid was added, and the reaction was stopped. Next, the reaction solution was filtered, and unreacted HDI was removed using a thin-film distillation device.

The viscosity of the obtained isocyanate compound A at 25° C. was 25000 mPa·s, the isocyanate group content was 19.9 mass %, the number-average molecular weight was 1080, and the average number of isocyanate groups was 5.1. The number-average molecular weight was a value in terms of polystyrene measured by gel permeation chromatography (GPC). Next, the presence of a urethane bond, an allophanate bond, an isocyanurate bond was verified by nuclear magnetic resonance (NMR) spectroscopy.

The internal atmosphere of a four-neck flask to which a stirrer, a thermometer, a reflux cooling pipe, a nitrogen blowing pipe, and a dropping funnel were attached was set as a nitrogen atmosphere, 100 parts by mass of the obtained isocyanate compound A, 42.3 parts by mass of methoxy polyethylene glycol having a number-average molecular weight of 400, and 76.6 parts by mass of dipropylene glycol dimethyl ether were put into the four-neck flask, and the internal temperature of the reactor was kept at 80° C. for 6 hours. Next, the temperature of the reaction solution was cooled to 60° C., 72 parts by mass of diethyl malonate and 0.88 parts by mass of 28 mass % sodium methylate methanol solution were added, the reactor was left to stand for 4 hours, and 0.86 parts by mass of 2-ethylhexyl acid phosphate was added.

Next, 43.3 parts by mass of diisopropylamine was added, and the reaction solution temperature was kept at 70° C. for 5 hours. The reaction solution was analyzed using a gas chromatograph, it was verified that the reaction rate of diisopropylamine was 70%, and the isocyanate compound A was obtained (solid content concentration: 70 mass %, effective NCO group: 5.3 mass %).

Crosslinking catalyst: an organic tin compound (ELASTRON Cat-21, manufactured by DKS Co., Ltd.)

Particles: silica sol having an average particle size of 80 nm

Surfactant: a polyethylene oxide surfactant (NAROACTY CL-95, manufactured by Sanyo Chemical Industries Ltd.)

Using a composition for preparing an acrylic substrate having the following composition, a PET substrate was prepared according to the following method.

(Composition for Preparing PET Substrate)

As a substrate, a laminated film including three polyester resin layers (I layer/II layer/III layer) was prepared using the following method.

A raw material polyester 1 and a raw material polyester 2 were obtained using the same method of preparing a raw material polyester 1 and a raw material polyester 2 described in paragraphs "0169" to "0178" of JP2015-072439A.

A molten resin for forming the II layer positioned between the I layer and the III layer was adjusted as follows. 10 parts by mass of an ultraviolet absorber (2,2'-(1,4-phenylene)bis-(4H-3,1-benzoxazin-4-one)) was added to 90 parts by mass of the raw material polyester 1 to prepare the raw material polyester 2. 10 parts by mass of the raw material polyester 2 was dried such that the moisture content was 20 parts per million (ppm) or lower, was put into a hopper 1 of a single screw kneader extruder 1 having a diameter of 50 mm, and was melted at 300° C. using an extruder 1.

The raw material polyester 1 was dried such that the moisture content was 20 ppm or lower, was put into a hopper 2 of a single screw kneader extruder 2 having a diameter of 30 mm, and was melted at 300° C. using an extruder 2. As a result, molten resins for forming the I layer and the III layer were prepared. The two molten resins were caused to pass through a gear pump and a filter (pore diameter: 20 μm). Next, using a three-layer merging block of two types of molten resins, the two molten resins were laminated such that the molten resin extruded from the extruder 1 formed an interlayer (the II layer) and the molten resin extruded from the extruder 2 formed outer layers (the I layer and the III layer), and the laminate was extruded in a sheet shape from a die having a width of 120 mm. The molten resin sheet extruded from the die was extruded on a cooling cast drum set to a temperature of 25° C. and was adhered to the cooling cast drum using an electrostatic application method. A non-stretched film was peeled off using a peeling roll disposed opposite to the cooling cast drum. At this time, the discharge amounts of the respective extruders were adjusted such that a ratio between the thicknesses of the I layer, the II layer, and the III layer was 10:80:10. Using a heated group of rolls and an infrared heater, the non-stretched film was heated such that the film surface temperature was 95° C., and was stretched to 3.1 times in a film traveling direction using the group of rolls having different peripheral speeds. As a result, a substrate was obtained.

<Ultraviolet Absorber>

UV01
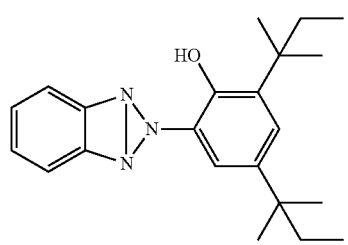

UV02
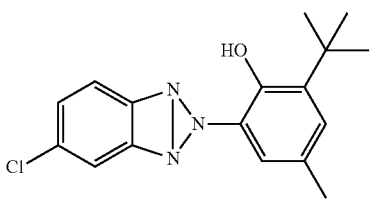

UV03
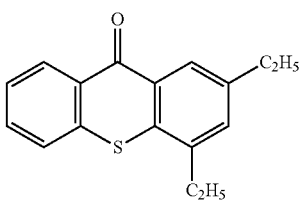

<Colorant>
Colorant 1: C.I. Pigment Red 122 (manufactured by BASF SE)
Colorant 2: C.I. Pigment Red 254 (manufactured by Tokyo Chemical Industry Co., Ltd.)

<Liquid Crystal Compound>
The following materials were used as a rod-shaped liquid crystal compound and a disk-shaped liquid crystal compound.

8CB
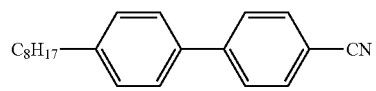

12CB
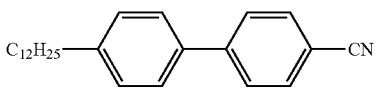

Chiral Liquid Crystal
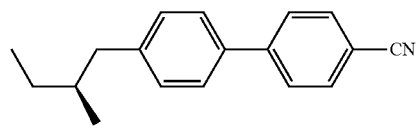

A
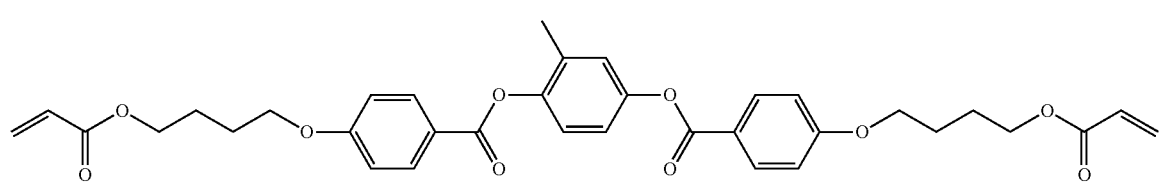

B
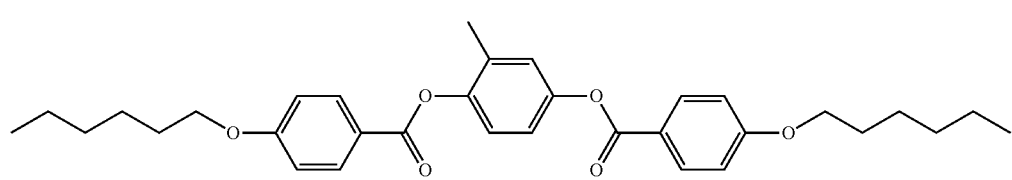

C
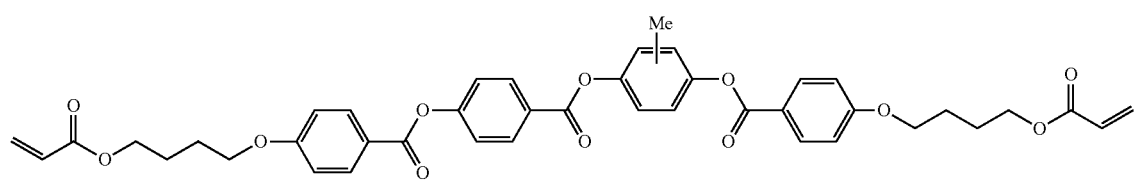

D
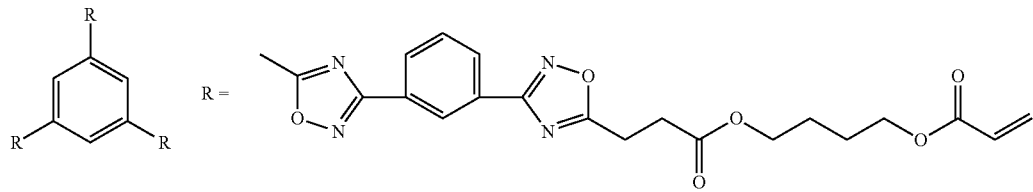
<Chiral Agent>
Materials shown in Table 1 below were used as chiral agents used in Examples and Comparative Examples.
TABLE 1
| | Kind |
|---|---|
| CH1 | Paliocolor (Registered Trade Name) LC 756, Manufactured by BASF SE |
| CH2 | |

<Alignment Assistant>

Materials shown in Table 2 below were used as alignment assistants. Each of alignment assistants OA1 to OA3 represented by the following structural formulae is a mixture (mixing mass ratio=50:50) of two compounds that are different from each other in a substitution site of a methyl group in a trimethyl-substituted benzene ring.

Example 1 (Example 101)

<Preparation of Substrate S1 with First Aligned Film and Substrate S2 with Second Aligned Film>
(Alkali Saponification Treatment of Substrate)

The TAC substrate was caused to pass through an induction heating roll at a temperature of 60° C. such that the film

TABLE 2

| Alignment Assistant | Kind |
|---|---|
| OA1 | Alignment Assistant 1 |

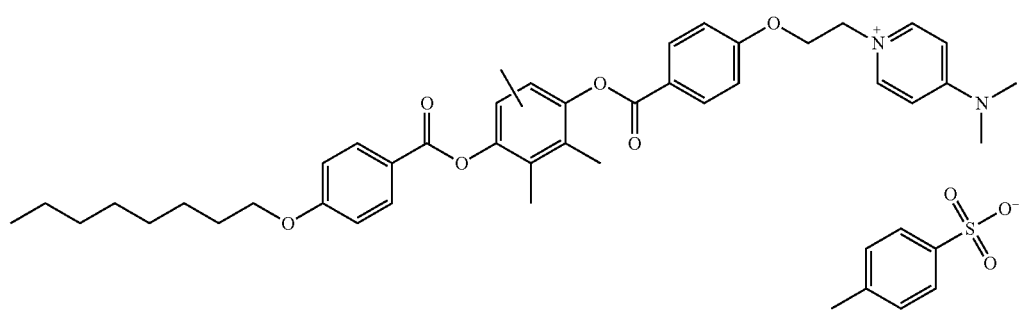

| | |
|---|---|
| OA2 | Alignment Assistant 2 |

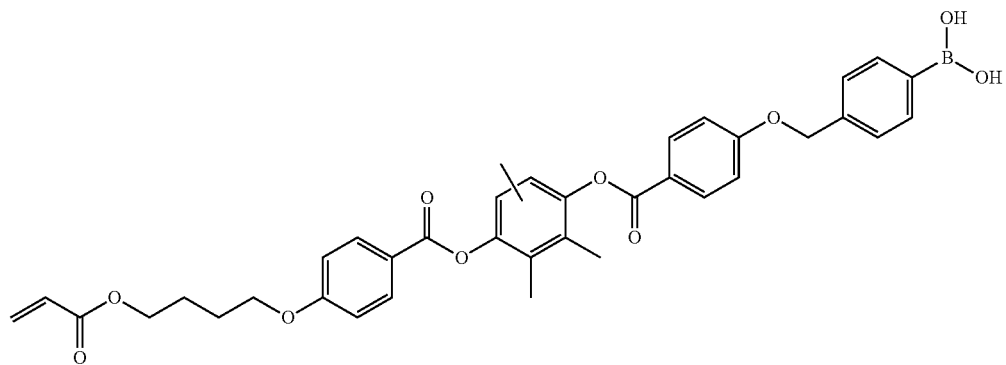

| | |
|---|---|
| OA3 | Alignment Assistant 3<br>A compound represented by the following structural formula is a mixture (mixing mass ratio = 50:50) of two compounds that are different from each other in a substitution site of a methyl group in a trimethyl-substituted benzene ring. |

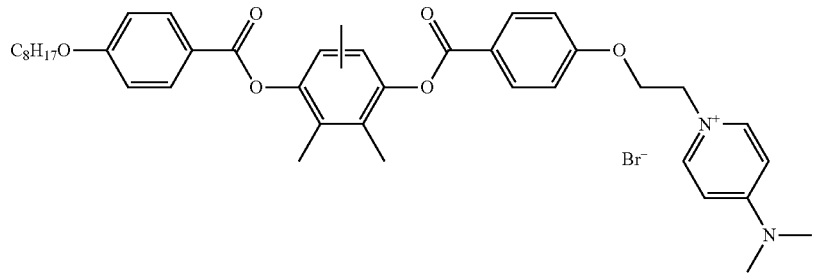

<Alignment Temperature Lowering Agent>

Alignment temperature lowering agent α: n-butyl acrylate

Alignment temperature lowering agent β: 1-butyl-3-methylimidazolium hexafluorophosphate surface temperature was increased to 40° C., an alkali solution having a composition shown in Table 3 below was applied to a single surface of the film using a bar coater in an application amount of 14 ml/m², and the film was heated to 110° C. The film was transported for 10 seconds under a steam infrared electric heater (manufactured by Noritake Co., Ltd.). Next, 3 ml/m² of pure water was applied using the same bar coater. Next, water washing using a foundry coater and water draining using an air knife were repeated three times, and then the film was transported and dried in a drying zone at 70° C. for 10 seconds. As a result, a TAC substrate having undergone the alkali saponification treatment was prepared.

TABLE 3

| Alkali Solvent Composition | |
| --- | --- |
| Potassium Hydroxide | 4.7 Parts by Mass |
| Water | 15.8 Parts by Mass |
| Isopropanol | 63.7 Parts by Mass |
| Surfactant ($C_{14}H_{29}O(CH_2CH_2O)_{20}H$) | 1.0 Part by Mass |
| Propylene Glycol | 14.8 Parts by Mass |

(Formation of Aligned Film)

In Example 1, a photo-alignment film formed using the following method was used as an aligned film.

A coating solution for forming a photo-alignment film having the following composition was continuously applied to the elongated TAC substrate having undergone the saponification treatment as described above using a #14 wire bar such that the thickness of the aligned film was 0.5 μm. The coating solution was dried with warm air at 60° C. for 60 seconds and dried with warm air at 100° C. for 120 seconds.

Coating Solution for Forming Photo-Alignment Film
  The following compound LO-1: 1 part by mass
  Water: 16 parts by mass
  Butoxy ethanol: 42 parts by mass
  Propylene glycol monomethyl ether: 42 parts by mass The following composition was applied to the surface of the TAC substrate having undergone the alkali saponification treatment using a #2 wire bar. The composition was dried with warm air at 60° C. for 60 seconds. As a result, a photo-alignment film was prepared. The photo-alignment film was vertically irradiated with ultraviolet light at 750 mW/cm² using an extra high pressure mercury lamp (UL750, manufactured by Hoya Candeo Optronics Corporation) in the air. At this time, a wire grid polarizer (ProFlux PPL02, manufactured by Moxtek, Inc.) was set at an angle 45° with respect to the surface of the photo-alignment film, and the photo-alignment film was exposed. The illuminance of the ultraviolet light used at this time was 5 mW/cm² in the UV-A band (cumulative value at a wavelength of 380 nm to 320 nm), and the irradiation dose was 50 mJ/cm² in the UV-A band.

Two TAC substrates on which the aligned film was formed were prepared. Among these, the TAC substrate used for the application of the liquid crystal layer was set as the substrate S1 with the first aligned film, and the TAC substrate used for the application of the epoxy resin was set as the substrate S2 with the second aligned film.

<Preparation of Substrate S1 with First Aligned Film on which Liquid Crystal Layer was Formed>

A coating solution R-I including a rod-shaped liquid crystal compound having the following composition was prepared as a composition for preparing a liquid crystal layer.

(Coating Solution R-I Including Rod-Shaped Liquid Crystal Compound)

Rod-shaped liquid crystal compound (12CB): 50.0 parts by mass
  Rod-shaped liquid crystal compound (A): 50.0 parts by mass
  Chiral agent (CH1): 5.0 parts by mass
  Alignment assistant (OA1): 0.9 parts by mass
  Alignment assistant (OA2): 0.03 parts by mass
  Alignment assistant (OA3): 0.05 parts by mass
  Polyfunctional monomer A-TMMT (manufactured by Shin-Nakamura Chemical Co., Ltd.): 1.0 part by mass
  Surfactant (SA1, molecular weight: 628): 0.15 parts by mass
  Methyl ethyl ketone: 165.0 parts by mass
  Cyclohexanone: 10.0 parts by mass
  Surfactant SA1:

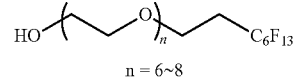

$n = 6\sim8$

The substrate S1 (width: 1340 mm) with the first aligned film was prepared, and the coating solution (R-I) including the rod-shaped liquid crystal compound was applied to the

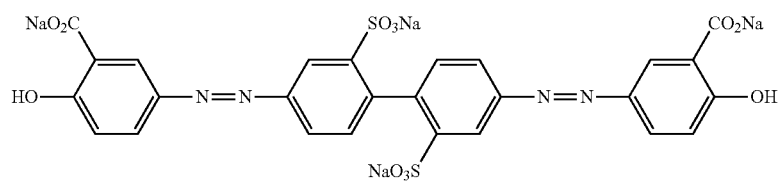

LO-1 aligned film using a #3.6 wire bar such that the thickness of the liquid crystal layer after drying was 3.0 μm. First, the application was not performed until the coating length was 5 m. Next, in a case where the coating length was 5 m to 1005 m, the coating solution (R-I) including the rod-shaped liquid crystal compound was applied to a width region of 15 mm to 1325 mm from an end portion of the substrate S1 with the first aligned film (controlled by attaching or detaching a casting die). In a case where the coating length was 1005 m to 1010 m, the application was not performed.

This way, a region where the liquid crystal layer was not formed was provided on end portions in a longitudinal direction and a width direction of the substrate S1 with the first aligned film. The transport speed (V) of the film was 20 m/min. In order to dry the solvent of the coating solution and to mature the alignment of the rod-shaped liquid crystal compound, the film was heated with warm air at 85° C. for 120 seconds. As a result, the substrate S1 with the first aligned film on which the liquid crystal layer was formed was prepared. At this time, a longitudinal direction and a transport direction of the elongated film were parallel to each other, and a rotation axis of a rubbing roller was shifted clockwise from the film longitudinal direction by 45°

<Preparation of Substrate S2 with Second Aligned Film to which Epoxy Resin was Applied>

The substrate S2 (width: 1340 mm) with the second aligned film was prepared in which a longitudinal direction and a transport direction of the elongated film were parallel to each other as in the substrate S1 with the first aligned film S 1, and a rotation axis of a rubbing roller was shifted clockwise from the film longitudinal direction by 135°. An epoxy resin was applied to the entire width (1340 mm) of the substrate S2 with the second aligned film until the coating length was 5 m (controlled by attaching or detaching a casting die). In a case where the coating length was 1005 m to 1010 m, the epoxy resin was applied to the entire width of the substrate S2 again.

Using a casting die having a slit width of 10 mm, the epoxy resin with a width of 10 mm was applied to a width region of 5 mm to 15 mm and a portion at a width region of 1325 mm to 1335 mm from an end portion of the substrate S2 with the second aligned film. The epoxy resin was applied to the substrate S2 with the second aligned film such that a gap was not formed with the portions having the entire width applied and such that only the end portions were filled. The substrate S2 with the second aligned film was heated with warm air at 50° C. for 60 seconds. As a result, the substrate S2 with the second aligned film to which the epoxy resin was applied was prepared.

<Preparation of Infrared Control Film>

The substrate S1 with the first aligned film on which the liquid crystal layer and the substrate S2 with the second aligned film to which the epoxy was applied were disposed to overlap each other using a nip roll, and were adjusted such that the liquid crystal layer, which was formed on the substrate S1 with the first aligned film, and the epoxy resin, which was applied to the end portions of the substrate S2 with the second aligned film, were interposed between the substrate S1 with the first aligned film and the substrate S2 with the second aligned film.

At this time, the regions of the substrate S1 where the liquid crystal layer was not formed and the epoxy resin applied portions of the substrate S2 were disposed to overlap with each other, the regions being formed on the end portions of the substrate S1 with the first aligned film on which the liquid crystal layer was formed, and the epoxy resin applied portions being formed on the substrate S2 with the second aligned film to which the epoxy resin was applied. Specifically, the transport speed, the adhering timing, and the like were adjusted such that the epoxy resin applied portions and the liquid crystal layer did not overlap each other and such that the liquid crystal layer was surrounded by the epoxy resin, the epoxy resin applied portions being formed on the entire width regions of 5 m from opposite end portions of the substrate S2 with the second aligned film to which the epoxy resin was applied in the longitudinal direction, a region at a distance of 5 m to 1005 m from an end portion in the longitudinal direction and at a distance of 5 mm to 15 mm from an end portion in the width direction, and a region at a distance of 1325 mm to 1335 mm from an end portion in the width direction, and the liquid crystal layer formed on a region at a distance of 5 m to 1005 m from an end portion of the substrate S1 with the first aligned film in the longitudinal direction and at a distance of 15 mm to 1325 mm from an end portion thereof in the width direction.

In a state where the substrate S1 with the first aligned film on which the liquid crystal layer was formed and the substrate S2 with the second aligned film to which the epoxy resin was applied overlapped each other, the substrates were wound around a backup roller and were irradiated with ultraviolet light while continuously being transported. The substrate S1 with the first aligned film, the liquid crystal layer, and the substrate S2 with the second aligned film were laminated, and the laminate in which the end portions of the liquid crystal layer were sealed with the epoxy resin was obtained as an infrared control film according to Example 1.

The infrared control film according to Example 1 was wound in a roll shape, and this roll was set as a roll according to Example 1. An infrared control film and a roll according to Example 101 have the same configurations as the infrared control film and the roll according to Example 1.

An infrared control film sample having a desired size was obtained from the prepared infrared control film or the prepared roll using a sampling method with reference to a cutting method described in paragraphs "0092" to "0095" of JP2010-45337A.

Examples 2 to 12, Comparative Examples 1 to 3, Examples 102 to 104, Comparative Example 101

Infrared control films according to Examples and Comparative Examples and rolls according to Examples and Comparative Examples were prepared using the same method as in Example 1, except that configurations of the infrared control films were changed as shown in Tables 4 and 6 below.

In Example 6 and Comparative Examples 1 to 3 and 101, a polyimide aligned film prepared using the following method was used instead of the photo-alignment film.

The polyimide aligned film was obtained by applying a polyamic acid (for example, LQ/LX series manufactured by Hitachi Chemical Co., Ltd.; SE series manufactured by Nissan Chemical Industries Ltd.) to a support surface, firing the film at 100° C. to 300° C. for 0.5 to 1 hour, and rubbing the film.

In Comparative Examples 1, 2, and 101, quartz glass (manufactured by Asahi Glass Co., Ltd.) was used as the substrate. The quartz glass used in Comparative Examples 1, 2, and 101 did not include an ultraviolet absorber and a colorant.

[Evaluation]

<Evaluation before Durability Test>

(Transmittance of Incidence Ray at Polar Angle of 0° (Front-Direction Tint-Visible Light Range))

Using a spectrophotometer UV4100 (manufactured by Hitachi High-Technologies Corporation), the transmittances of each of the infrared control films prepared as described above with respect to an incidence ray at a polar angle of 0° at 450, 550, and 700 nm were measured.

Based on the transmittances, front-direction tints a1 and b1 were calculated from the following expressions.

a1=(Transmittance of Incidence Ray at 450 nm at Polar Angle of 0°)/(Transmittance of Incidence Ray at 550 nm at Polar Angle of 0°)

b1=(Transmittance of Incidence Ray at 550 nm at Polar Angle of 0°)/(Transmittance of Incidence Ray at 700 nm at Polar Angle of 0°)

The obtained results are shown in Tables 5 and 7 below.

(Transmittance of Incidence Ray at Polar Angle of 0° (Infrared Range) and Transmittance of Incidence Ray at Polar Angle of 60° (Infrared Range))

Using a spectrophotometer UV4100 (manufactured by Hitachi High-Technologies Corporation), regarding each of the infrared control films prepared as described above, transmittances at 0° C. with respect to an incidence ray at 1000 nm and polar angles of 0° and 60°, transmittances at 25° C. with respect to an incidence ray at 1000 nm and polar angles of 0° and 60°, and transmittances at 40° C. with respect to an incidence ray at 1000 nm and polar angles of 0° and 60° were measured. During the measurement, a Peltier element was attached to a part of an infrared control film installation portion, and the surface temperature of the infrared control film was adjusted to 0° C. or 40° C. In order to measure the surface temperature, a multi input data collection system NR-600 (manufactured by Keyence Corporation) was used, and a thermocouple was attached to the infrared control film. At this time, in order to prevent dew condensation, a hygrothermal environment in the indoor measurement was at 25° C. and a relative humidity of 10%.

The obtained results are shown in Tables 5 and 7 below.

(Transmittance of Incidence Ray at Polar Angle of 60° (Oblique-Direction Tint-Visible Light Range))

Using a spectrophotometer UV4100 (manufactured by Hitachi High-Technologies Corporation), the transmittances of each of the infrared control films prepared as described above with respect to an incidence ray at a polar angle of 60° at 450, 550, and 700 nm were measured.

Based on the transmittances, front-direction tints a2 and b2 were calculated from the following expressions.

a2=(Transmittance of Incidence Ray at 450 nm at Polar Angle of 60°)/(Transmittance of Incidence Ray at 550 nm at Polar Angle of 60°)

b2=(Transmittance of Incidence Ray at 550 nm at Polar Angle of 60°)/(Transmittance of Incidence Ray at 700 nm at Polar Angle of 60°)

The obtained results are shown in Tables 5 and 7 below.

(Haze)

A 40 mm×40 mm sample was obtained from each of the infrared control films prepared as described above. Using a haze meter (HGM-2DP, manufactured by Suga Test Instruments Co., Ltd.) at 25° C. and a relative humidity of 60%, the haze of the sample was measured at a surface temperature of 25° C. before the durability test according to Japanese Industrial Standards (JIS) K-6714.

Further, a 40 mm×40 mm sample was obtained from each of the infrared control films according to Comparative Example 101 and Examples 101 to 104. Using a haze meter (HGM-2DP, manufactured by Suga Test Instruments Co., Ltd.) at 25° C. and a relative humidity of 60%, the haze of the sample was measured at a surface temperature of −20° C. before the durability test. During the measurement, a Peltier element was attached to a part of an infrared control film installation portion, and the surface temperature of the infrared control film was adjusted to −20° C. In order to measure the surface temperature, a multi input data collection system NR-600 (manufactured by Keyence Corporation) was used, and a thermocouple was attached to the infrared control film. At this time, in order to prevent dew condensation, a hygrothermal environment in the indoor measurement was at 25° C. and a relative humidity of 10%.

The obtained results are shown in Tables 5 and 7 below.

<Evaluation after Durability Test>

A heat cycle durability test (500 cycles of temperature condition changes between −35° C.×1 hour and 75° C.×1 hour), was performed.

Using a spectrophotometer UV4100 (manufactured by Hitachi High-Technologies Corporation), the transmittances of each of the infrared control films prepared as described above with respect to an incidence ray at a polar angle of 60° at 450, 550, and 700 nm were measured after the heat cycle durability test.

Based on the transmittances, front-direction tints a2 and b2 were calculated from the following expressions.

a2=(Transmittance of Incidence Ray at 450 nm at Polar Angle of 60°)/(Transmittance of Incidence Ray at 550 nm at Polar Angle of 60°)

b2=(Transmittance of Incidence Ray at 550 nm at Polar Angle of 60°)/(Transmittance of Incidence Ray at 700 nm at Polar Angle of 60°)

After the heat cycle durability test, a 40 mm×40 mm sample was obtained from each of the infrared control films prepared as described above. Using a haze meter (HGM-2DP, manufactured by Suga Test Instruments Co., Ltd.) at 25° C. and a relative humidity of 60%, the haze of the sample was measured at a surface temperature of 25° C. after the durability test according to JIS K-6714.

The obtained results are shown in Tables 5 and 7 below.

TABLE 4

| | Configuration of Infrared Control Film | | | | | | | | | | | |
|---|---|---|---|---|---|---|---|---|---|---|---|---|
| | Substrate | | | Liqjuid Crystal Layer | | | | | | | | |
| | | Ultraviolet Absorber, Colorant | | Aligned Film | | Liquid Crystal Compound | | | | | | |
| | Major Component | Kind | Addition Amount [mass %] | Kind | Thickness [μm] | Kind | Addition Amount [mass %] | Kind | Addition Amount [mass %] | Kind | Addition Amount [mass %] | Chiral Agent | Thickness [μm] |
| Example 1 | TAC | UV01 | 1 | Photo-alignment Film | 0.5 | 12CB | 50% | A | 50% | — | — | CH1 | 3.0 |
| Example 2 | TAC | UV01 | I | Photo-aligtunent Film | 0.5 | 8CB | 60% | B | 40% | — | — | CH1 | 2.8 |
| Example 3 | TAC | UV01 | 1 | Photo-alignment Film | 0.5 | 8CB | 60% | Chiral Liquid Crystal | 40% | — | — | — | 3.0 |

TABLE 4-continued

| | Configuration of Infrared Control Film | | | | | | | | | | | |
|---|---|---|---|---|---|---|---|---|---|---|---|---|
| | Substrate | | | Liqjuid Crystal Layer | | | | | | | | |
| | Ultraviolet Absorber, Colorant | | | | Liquid Crystal Compound | | | | | | | |
| | Major Component | Kind | Addition Amount [mass %] | Aligned Film Kind | Thickness [µm] | Kind | Addition Amount [mass %] | Kind | Addition Amount [mass %] | Kind | Addition Amount [mass %] | Chiral Agent | Thickness [µm] |
| Example 4 | TAC | UV02 | 1 | Photo-alignment Film | 0.5 | 12CB | 50% | A | 40% | C | 10% | CH2 | 2.9 |
| Example 5 | TAC | UV01/ Colorant 1/ Colorant 2 | 1/ 0.005/ 0.003 | Photo-alignment Film | 0.5 | 12CB | 60% | A | 30% | C | 10% | CH2 | 2.9 |
| Example 6 | TAC | UV01 | 1 | Polyimide | 0.4 | 8CB | 60% | B | 40% | — | — | CH1 | 3.1 |
| Example 7 | TAC | UV01 | I | Photo-alignment Film | 0.5 | 12CB | 50% | D | 50% | — | — | CHI | 3.0 |
| Example 8 | TAC | UV03 | I | Photo-alignment Film | 0.5 | 8CB | 60% | B | 40% | — | — | CHI | 2.9 |
| Example 9 | TAC | UV01 | 1 | Photo-alignment Film | 0.5 | 8CB | 60% | B | 40% | — | — | CHI | 4.0 |
| Example 10 | Acryl | UV01 | 1 | Photo-alignment Film | 0.5 | 12CB | 50% | A | 40% | C | 10% | CH2 | 2.8 |
| Example 11 | PET | UV02 | 1 | — | — | 12CB | 50% | A | 40% | C | 10% | CH2 | 2.9 |
| Example 12 | TAC | Colorant 1/ Colorant 2 | 0.01/ 0.003 | Photo-alignment Film | 0.5 | 12CB | 60% | A | 30% | C | 10% | CH2 | 3.0 |
| Comparative Example 1 | Quartz Glass | — | — | Polyimide | 2 | 12CB | 60% | Chiral Liquid Crystal | 40% | — | — | — | 32 |
| Comparative Example 2 | Quartz Glass | — | — | Polyimide | 2 | 12CB | 80% | A | 20% | — | — | CH1 | 35 |
| Comparative Example 3 | TAC | — | — | Polyimide | 2 | 12CB | 80% | A | 20% | — | — | CHI | 35 |

TABLE 5

| | Evaluation before Durability Test | | | | | | | | | | | | | | | | Evaluation after Durability Test | | | | | | | |
|---|---|---|---|---|---|---|---|---|---|---|---|---|---|---|---|---|---|---|---|---|---|---|---|---|
| | Transmittance of Incidence Ray at Polar Angle of 0° | | | | | | | | | Transmittance of Incidence Ray at Polar Angle of 60° | | | | | | | | Transmittance of Incidence Ray at Polar Angle of 60° | | | | | | | |
| | 25° C. | | | | | | Front-Direction Tint a1 | Front-Direction Tint b1 | 0° C. 1000 nm | 40° C. 1000 nm | 25° C. | | | | | Oblique-Direction Tint a2 | Oblique-Direction Tint b2 | Haze 25° C. | 25° C. | | | | Oblique-Direction Tint a2 | Oblique-Direction Tint b2 | Haze 25° C. |
| | 450 nm | 550 nm | 700 nm | 1000 nm | | | | | | | 450 nm | 550 nm | 700 nm | 1000 nm | | | | | 450 nm | 550 nm | 700 nm | | | |
| Example 1 | 85% | 88% | 88% | 89% | 0.97 | 1.00 | 86% | 50% | 71% | 73% | 75% | 75% | 0.97 | 0.97 | 0.60% | 69% | 72% | 73% | 0.96 | 0.99 | 0.7% |
| Example 2 | 85% | 90% | 88% | 88% | 0.94 | 1.02 | 85% | 50% | 74% | 76% | 74% | 75% | 0.97 | 1.03 | 0.60% | 77% | 73% | 77% | 1.05 | 0.95 | 0.7% |
| Example 3 | 84% | 88% | 88% | 89% | 0.95 | 1.00 | 86% | 49% | 72% | 75% | 75% | 75% | 0.96 | 1.00 | 0.60% | 71% | 74% | 73% | 0.96 | 1.01 | 0.7% |
| Example 4 | 86% | 87% | 88% | 88% | 0.99 | 0.99 | 88% | 50% | 73% | 75% | 77% | 76% | 0.97 | 0.97 | 0.50% | 72% | 73% | 75% | 0.99 | 0.97 | 0.7% |
| Example 5 | 85% | 84% | 85% | 85% | 1.01 | 0.99 | 87% | 50% | 72% | 72% | 72% | 72% | 1.00 | 1.00 | 0.50% | 70% | 71% | 70% | 0.99 | 1.01 | 0.7% |
| Example 6 | 80% | 87% | 87% | 87% | 0.92 | 1.00 | 83% | 51% | 67% | 75% | 75% | 75% | 0.89 | 1.00 | 0.60% | 66% | 73% | 73% | 0.90 | 1.00 | 0.7% |
| Example 7 | 79% | 87% | 88% | 88% | 0.91 | 0.99 | 81% | 50% | 66% | 75% | 77% | 77% | 0.88 | 0.97 | 0.60% | 64% | 74% | 73% | 0.86 | 1.01 | 0.7% |
| Example 8 | 78% | 88% | 88% | 89% | 0.89 | 1.00 | 81% | 51% | 65% | 74% | 75% | 75% | 0.88 | 0.99 | 0.60% | 63% | 73% | 73% | 0.86 | 1.00 | 0.7% |
| Example 9 | 79% | 86% | 86% | 87% | 0.92 | 1.00 | 82% | 50% | 68% | 75% | 75% | 76% | 0.91 | 1.00 | 0.60% | 67% | 73% | 70% | 0.92 | 1.04 | 0.7% |
| Example 10 | 86% | 87% | 88% | 87% | 0.99 | 0.99 | 85% | 50% | 73% | 75% | 75% | 74% | 0.97 | 1.00 | 0.60% | 70% | 74% | 71% | 0.95 | 1.04 | 0.7% |
| Example 11 | 87% | 86% | 88% | 86% | 1.01 | 0.98 | 84% | 51% | 73% | 76% | 75% | 75% | 0.96 | 1.00 | 0.60% | 71% | 73% | 75% | 0.97 | 0.97 | 0.7% |
| Example 12 | 85% | 81% | 80% | 81% | 1.05 | 1.01 | 82% | 49% | 72% | 69% | 69% | 70% | 1.04 | 1.00 | 0.50% | 70% | 69% | 68% | 1.01 | 1.01 | 0.7% |
| Comparative Example 1 | 65% | 88% | 88% | 88% | 0.74 | 1.00 | 80% | 51% | 52% | 72% | 71% | 71% | 0.72 | 1.01 | 0.70% | 37% | 55% | 69% | 0.67 | 0.80 | 9.8% |
| Comparative Example 2 | 66% | 88% | 87% | 87% | 0.75 | 1.01 | 80% | 52% | 55% | 72% | 71% | 70% | 0.76 | 1.01 | 0.80% | 35% | 60% | 65% | 0.58 | 0.92 | 4.8% |
| Comparative Example 3 | 64% | 86% | 88% | 88% | 0.74 | 0.98 | 79% | 50% | 50% | 72% | 71% | 71% | 0.69 | 1.01 | 0.90% | 35% | 60% | 65% | 0.58 | 0.92 | 4.9% |

TABLE 6

Configuration of Infrared Control Film

| | Substrate | | | Liquid Crystal Layer | | | | | | | | |
|---|---|---|---|---|---|---|---|---|---|---|---|---|
| | | Ultraviolet Absorber, Colorant | | Aligned Film | | Liquid Crystal Compound | | | | Alignment Temperature Lowering Agent | | |
| | Major Component | Kind | Addition Amount [mass %] | Kind | Thickness [μm] | Kind | Addition Amount [mass %] | Kind | Addition Amount [mass %] | Kind | Addition Amount [mass %] | Chiral Agent | Thickness [μm] |
| Example 101 | TAC | UV01 | 1.5 | Photo-alignment Film | 0.5 | 12CB | 50% | A | 50% | — | — | CH1 | 3.0 |
| Example 102 | TAC | UV01 | 1.5 | Photo-alignment Film | 0.5 | 8CB | 70% | B | 30% | — | — | CH2 | 3.0 |
| Example 103 | TAC | UV01 | 1.3 | Photo-alignment Film | 0.5 | 8CB | 70% | B | 28% | α | 2% | CH2 | 3.0 |
| Example 104 | TAC | UV01 | 1.5 | Photo-alignment Film | 0.5 | 8CB | 70% | B | 29% | β | 1% | CH2 | 3.0 |
| Comparative Example 101 | Quartz Glass | — | — | Polyimide | 2 | 12CB | 50% | Chiral Liquid Crystal | 50% | — | — | — | 33 |

TABLE 7

Evaluation before Durability Test

| | Transmittance of Incidence Ray at Polar Angle of 0° | | | | | | Transmittance of Incidence Ray at Polar Angle of 60° | | | | | | | | | |
|---|---|---|---|---|---|---|---|---|---|---|---|---|---|---|---|---|
| | 25° C. | | | | | | | | 25° C. | | | | | | | |
| | 450 nm | 550 nm | 700 nm | 100 nm | Front-Direction Tint a1 | Front-Direction Tint b1 | 0° C. 1000 nm | 40° C. 1000 nm | 450 nm | 550 nm | 700 nm | 1000 nm | O-blique-Direction Tint a1 | O-blique-Direction Tint b1 | 0° C. 1000 nm | 40° C. 1000 nm |
| Example 101 | 85% | 88% | 88% | 87% | 0.97 | 1.00 | 86% | 50% | 71% | 73% | 75% | 76% | 0.97 | 0.97 | 71% | 40% |
| Example 102 | 85% | 88% | 88% | 87% | 0.97 | 1.00 | 86% | 50% | 76% | 78% | 80% | 80% | 0.97 | 0.98 | 72% | 41% |
| Example 103 | 85% | 88% | 88% | 87% | 0.97 | 1.00 | 85% | 50% | 76% | 78% | 80% | 79% | 0.97 | 0.98 | 70% | 40% |
| Example 104 | 85% | 88% | 88% | 88% | 0.97 | 1.00 | 85% | 50% | 76% | 78% | 80% | 79% | 0.97 | 0.98 | 70% | 42% |
| Comparative Example 101 | 65% | 88% | 88% | 87% | 0.74 | 1.00 | 86% | 51% | 57% | 77% | 76% | 76% | 0.74 | 1.01 | 70% | 65% |

| | Evaluation after Durability Test | | | | | | |
|---|---|---|---|---|---|---|---|
| | Haze | | Transmittance of Incidence Ray at Polar Angle of 60° 25° C. | | | | |
| | | | | | | O-blique-Direction Tint a1 | O-blique-Direction Tint b1 | Haze |
| | −20° C. | 25° C. | 450 nm | 550 nm | 700 nm | | | 25° C. |
| Example 101 | 0.90% | 0.60% | 69% | 72% | 73% | 0.96 | 0.99 | 0.7% |
| Example 102 | 1.00% | 0.60% | 71% | 72% | 74% | 0.99 | 0.97 | 0.6% |
| Example 103 | 0.80% | 0.50% | 71% | 70% | 74% | 1.01 | 0.95 | 0.6% |

TABLE 7-continued

| | | | | | | | | |
|---|---|---|---|---|---|---|---|---|
| Example 104 | 0.70% | 0.60% | 69% | 72% | 72% | 0.96 | 1.00 | 0.7% |
| Comparative Example 101 | 4.00% | 0.70% | 37% | 55% | 69% | 0.67 | 0.80 | 9.8% |

It can be seen from Tables 4 to 7 that, in the infrared control film according to the present invention, the infrared light transmittance changes depending on the temperature, the tint in the front direction is excellent, and the durability is high. High durability represents that, even in a case where the number of times (heat cycles) of changing the infrared light transmittance depending on the temperature is increased, the property in which the infrared light transmittance changes depending on the temperature is not lost, and the haze after the durability test is low.

Further, it can be seen that, in a preferable aspect of the infrared control film according to the present invention, the tint in the oblique direction is excellent, and the front-direction tint after the durability test and the oblique-direction tint after the durability test are excellent. In addition, in a preferable aspect of the infrared control film according to the present invention using the photo-alignment film, the fact that the phase transition speed between the smectic liquid crystal phase and the cholesteric liquid crystal phase during a temperature change is higher than that in a case where the infrared control film using the polyimide aligned film is used can be verified using the method of verifying a homeotropically aligned state or a homogeneously aligned state described in this specification. It can be seen from the data of the transmittance at 1000 nm and at 25° C. and 40° C. of Tables 4 to 7 that the liquid crystal layer has a phase transition point between a smectic liquid crystal phase and a cholesteric liquid crystal phase in a temperature range of higher than 25° C. and 40° C. or lower. It can be seen from the transmittance at each wavelength and the haze at −20° C. of Table 7 that, in Examples 101 to 104, the liquid crystal layer forms the smectic liquid crystal phase in a temperature range of 20° C. to 25° C.

On the other hand, it can be seen from Comparative Examples 1 to 3 and 101 that, in a case where the substrate does not include an ultraviolet absorber and a colorant, the tint in the front direction is poor. It can be seen that, in the infrared control films according to Comparative Examples 1 to 3 and 101, the tint in the oblique direction is poor, and the evaluation results after the durability test are poor.

EXPLANATION OF REFERENCES

1: direction of incidence ray at polar angle of 0°
2: direction of incidence ray at polar angle of 60°
11: substrate
12: liquid crystal layer
13: infrared control film
21: glass
22: heat insulating layer
23: window
31: indoor side
32: outdoor side

What is claimed is:

1. An infrared control film comprising:
at least one liquid crystal layer; and
two substrates each of which includes at least one of an ultraviolet absorber or a colorant,
wherein the liquid crystal layer is disposed between the two substrates,
the substrate includes 0.001 mass % or higher of the ultraviolet absorber or the colorant with respect to a total mass of the substrate,
a transmittance of the infrared control film at 0° C. with respect to an incidence ray at 1000 nm at a polar angle of 0° is higher than 70%,
a transmittance of the infrared control film at 40° C. with respect to an incidence ray at 1000 nm at a polar angle of 0° is lower than 60%, and
the following Expression (1-a) and the following Expression (1-b) are satisfied, $$0.8 < a1 < 1.2 \quad \text{Expression (1-a)},$$

$$0.8 < b1 < 1.2 \quad \text{Expression (1-b)},$$

a1=(Transmittance of Incidence Ray at 450 nm at Polar Angle of 0°)/(Transmittance of Incidence Ray at 550 nm at Polar Angle of 0°), and
b1=(Transmittance of Incidence Ray at 550 nm at Polar Angle of 0°)/(Transmittance of Incidence Ray at 700 nm at Polar Angle of 0°).

2. The infrared control film according to claim 1, wherein the following Expression (2-a) and the following Expression (2-b) are satisfied, $$0.8 < a2 < 1.2 \quad \text{Expression (2-a)},$$

$$0.8 < b2 < 1.2 \quad \text{Expression (2-b)},$$

a2=(Transmittance of Incidence Ray at 450 nm at Polar Angle of 60°)/(Transmittance of Incidence Ray at 550 nm at Polar Angle of 60°), and
b2=(Transmittance of Incidence Ray at 550 nm at Polar Angle of 60°)/(Transmittance of Incidence Ray at 700 nm at Polar Angle of 60°).

3. The infrared control film according to claim 1, wherein the liquid crystal layer includes at least one liquid crystal compound and at least one chiral agent.

4. The infrared control film according to claim 1, wherein a haze of the infrared control film at −20° C. is 3% or lower.

5. The infrared control film according to claim 1, wherein the liquid crystal layer includes three or more liquid crystal compounds.

6. The infrared control film according to claim 1, wherein the liquid crystal layer has a phase transition point between a smectic liquid crystal phase and a cholesteric liquid crystal phase in a temperature range of higher than 25° C. and 40° C. or lower.

7. The infrared control film according to claim 1, wherein the liquid crystal layer is in a smectic liquid crystal phase in a temperature range of −20° C. to 25° C.

8. The infrared control film according to claim 1, wherein the liquid crystal layer includes a disk-shaped liquid crystal compound represented by the following Formula (1), $$D(\text{-}L\text{-}P)n \quad \text{Formula (1)}$$

in Formula (1), D represents a disk-shaped core, L represents a divalent linking group, P represents a polymerizable group or an alkyl chain having 2 to 10 carbon atoms, and n represents an integer of 4 to 12.

9. The infrared control film according to claim 1, wherein the liquid crystal layer includes an alignment start temperature lowering agent.

10. The infrared control film according to claim 1, wherein a thickness of the liquid crystal layer is 15 μm or less.

11. The infrared control film according to claim 1, further comprising:
an aligned film that is in direct contact with the liquid crystal layer.

12. The infrared control film according to claim 11, wherein the aligned film is a photo-alignment film.

13. The infrared control film according to claim 11, wherein a thickness of the aligned film is 3.0 μm or less.

14. A roll which is obtained by winding the infrared control film according to claim 1 in a roll shape.

15. A window comprising:
the infrared control film according to claim 1.

* * * * *